(12) United States Patent
Hsiao et al.

(10) Patent No.: US 7,028,836 B2
(45) Date of Patent: Apr. 18, 2006

(54) ANTI-THEFT SUBJECT FOR RENTAL

(75) Inventors: Yu-Ling Hsiao, Taichung (TW);
Yueh-Ching Wu, Taichung (TW)

(73) Assignee: Safe Lock Co., LTD, (TW)

( * ) Notice: Subject to any disclaimer, the term of this patent is extended or adjusted under 35 U.S.C. 154(b) by 0 days.

(21) Appl. No.: 10/920,356

(22) Filed: Aug. 18, 2004

(65) Prior Publication Data
US 2005/0098455 A1    May 12, 2005

(30) Foreign Application Priority Data
Nov. 12, 2003  (JP)  ............... 2003-382217
May 6, 2004    (JP)  ............... 2004-137180
Jun. 7, 2004   (JP)  ............... 2004-168134

(51) Int. Cl.
*B65D 85/57*  (2006.01)

(52) U.S. Cl. ............... 206/308.2; 70/57.1; 206/1.5

(58) Field of Classification Search ............... 206/1.5, 206/308.1, 308.2, 387.11; 70/57.1, 63
See application file for complete search history.

(56) References Cited

U.S. PATENT DOCUMENTS

| | | | | |
|---|---|---|---|---|
| 4,793,480 A | * | 12/1988 | Gelardi et al. | ............ 206/308.1 |
| 5,597,068 A | * | 1/1997 | Weisburn et al. | ........ 206/308.1 |
| 6,443,300 B1 | * | 9/2002 | Gelardi | ....................... 206/312 |
| 6,467,318 B1 | * | 10/2002 | Gattiker | ....................... 70/57.1 |
| 6,601,414 B1 | * | 8/2003 | Chang | .......................... 70/57.1 |
| 6,601,415 B1 | * | 8/2003 | Takinami | ..................... 70/57.1 |
| 6,694,782 B1 | * | 2/2004 | Mitsuyama | .................. 70/57.1 |
| 6,896,133 B1 | * | 5/2005 | Spagna | ..................... 206/308.2 |
| 2002/0003095 A1 | * | 1/2002 | Jaeb et al. | ............... 206/308.2 |
| 2004/0187530 A1 | * | 9/2004 | Lax et al. | ..................... 70/57.1 |

* cited by examiner

*Primary Examiner*—Luan K. Bui
(74) *Attorney, Agent, or Firm*—Wenderoth, Lind & Ponack, L.L.P.

(57) ABSTRACT

A receiving case of a disc is displayed with the receiving case locked in a display case to prevent the display case from being left in a shop upon rental. The display case includes a box body having a bottom wall and peripheral walls protruding from edges of the bottom wall, and a lid body at an edge of the box body via a hinge. A lock apparatus of the display case can not be unlocked except at the shop, and a locking part can be retained when unlocked. A receiving case has a box body for receiving a disc, and a lid body with side wall ends rotatably mounted to the box body via pins. The receiving case is fitted in the display case such that the hinges thereof are arranged adjacently parallel.

16 Claims, 23 Drawing Sheets

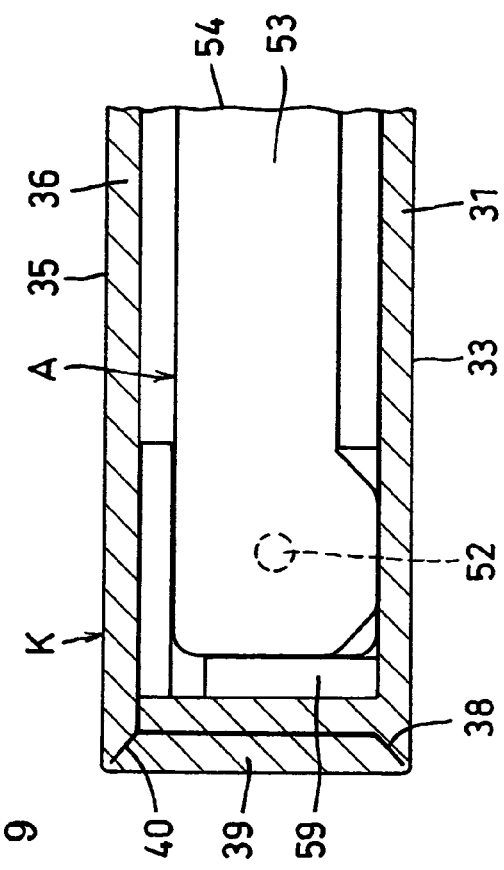
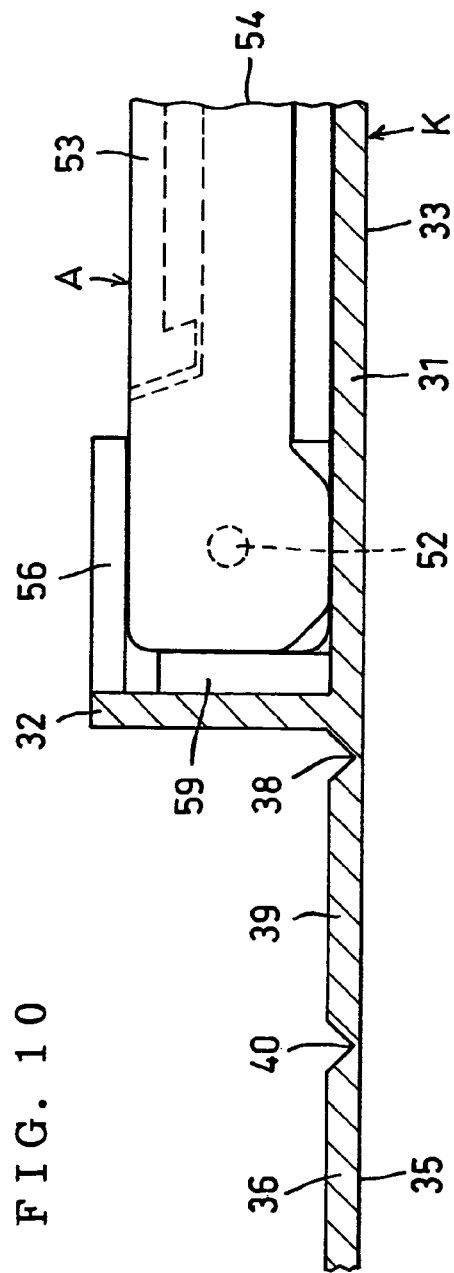
FIG. 9
FIG. 10

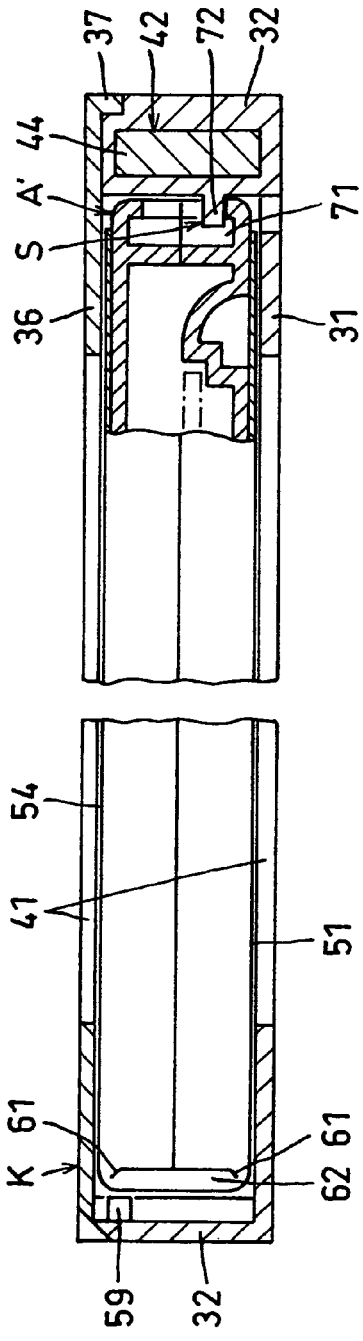
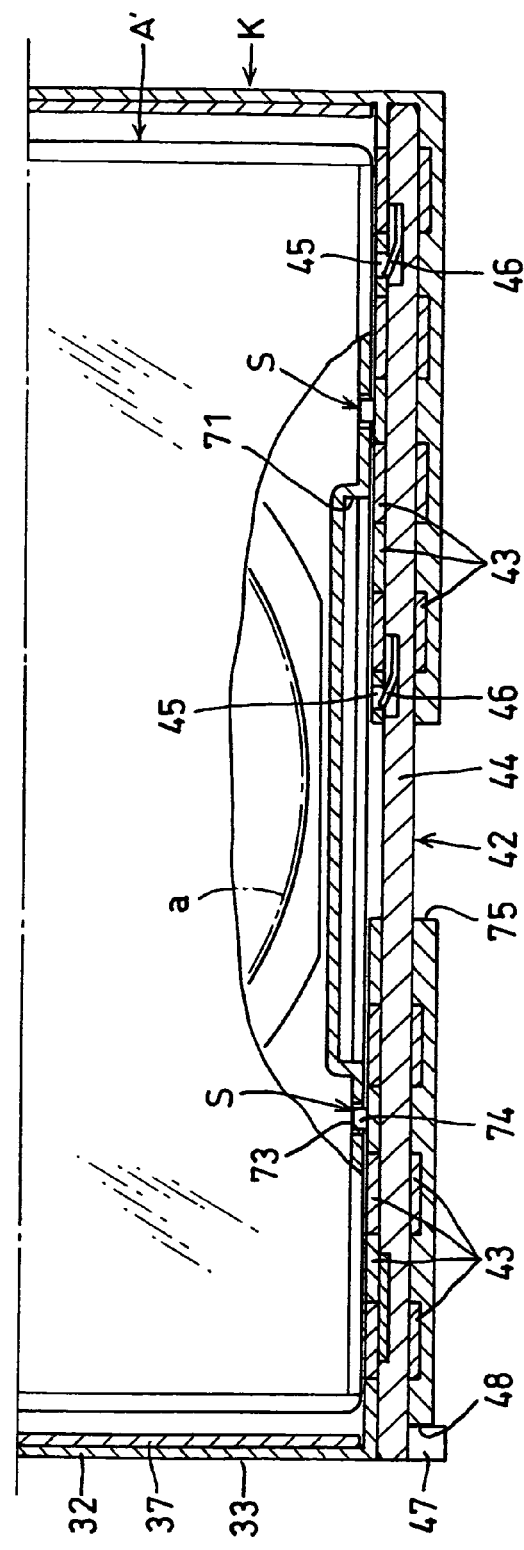
FIG. 14
FIG. 15

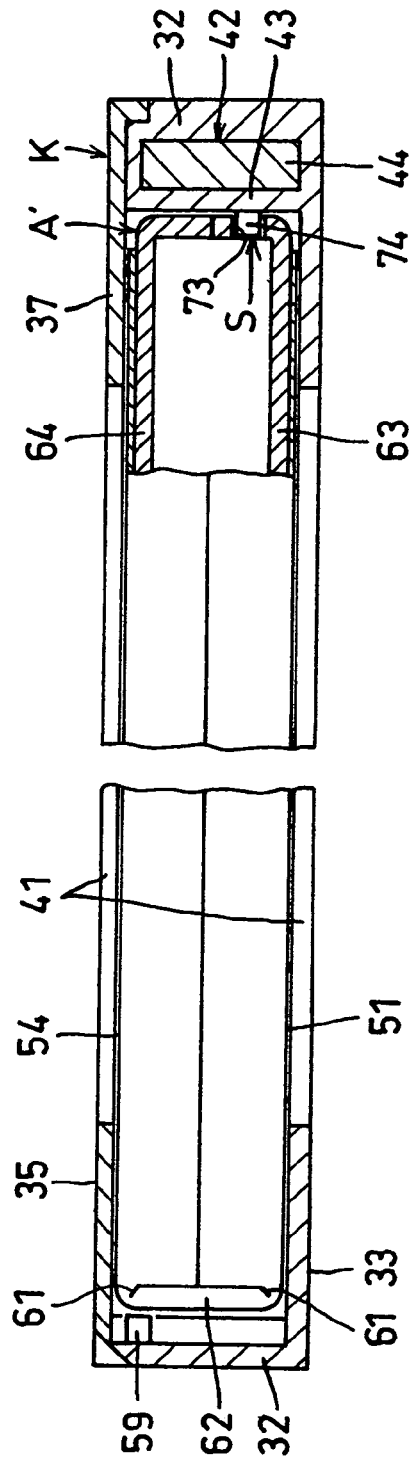
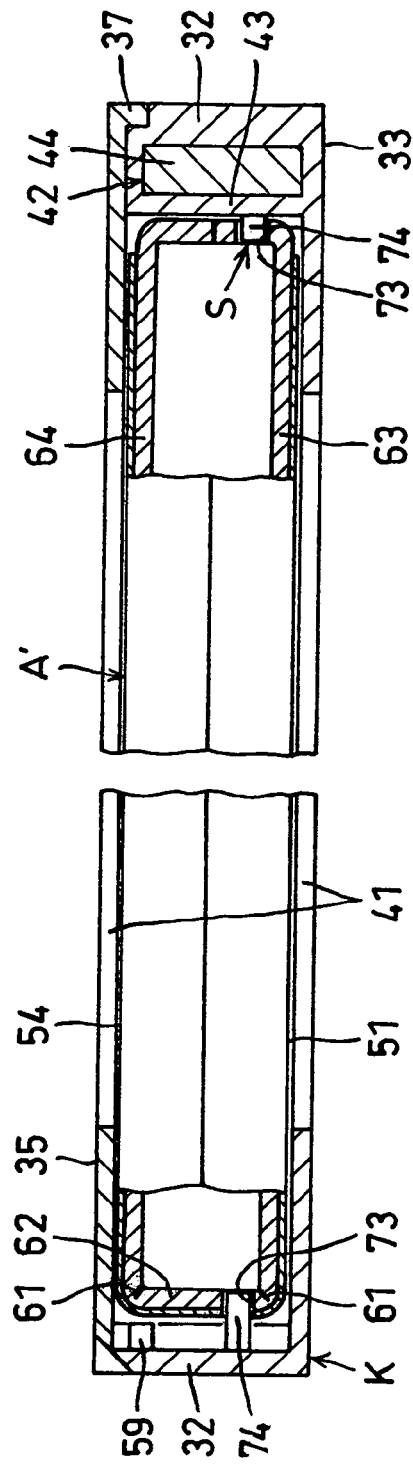
FIG. 16
FIG. 17

ANTI-THEFT SUBJECT FOR RENTAL

BACKGROUND OF THE INVENTION

1. Field of the Invention

This invention relates to an anti-theft device for use with a rental commodity, such as a music disc or video disc, received in a receiving case from a manufacturer.

2. Description of the Related Art

In the case of displaying a receiving case or a receiving tray for a disc shipped from the manufacturer to a shop, the receiving case is left open so as to easily pick up the received disc. Accordingly, the disc might be stolen.

Therefore, the disc can be displayed by wrapping the receiving case of the disc with a transparent synthetic resin bag (as disclosed in Japanese Unexamined Patent Publication No. 7-257675).

However, since the bag can be easily opened or torn up, the disc can still be stolen.

Accordingly, for the purpose of preventing the disc from being stolen from the receiving case or the receiving tray that holds the disc during its display, there is a structure in which the disc receiving tray in the above-mentioned patent publication is received in a display case at a shop.

A combined system of the display case mentioned above and the disc receiving case or the disc receiving tray is structured, as shown in FIGS. 22 to 26, such that a receiving case 4 and a receiving tray are formed by a sheet 2 having a folded bending portion 1 in a middle portion, and a tray main body 3 adhered to one end portion of the sheet 2 between an end edge of the sheet 2 and the bending portion 1. A disc 6 received in a receiving recess portion 5 of the tray main body 3 is covered by another end portion of the sheet 2.

A display case 7 receiving the receiving case 4 is constituted by box body 10 formed by a bottom wall 8, and side walls 9 and 9 continuously protruding from both side edges of the bottom wall 8, and a lid body 16 formed by an end wall 12 flexibly connected to one end edge of the bottom wall 8 via a half-cut hinge 11, a lid wall 14 flexibly connected to the end wall 12 via a half-cut hinge 13, and side walls 15 and 15 continuously protruding from both side edges of the lid wall 14 and that cover an outer side of the side wall 9 when the lid body 16 is closed over the box body 10.

The tray main body 3 is fitted to the box body 10 together with one of the sheets 2, and another of the sheets 2 in the receiving case 4 is fitted to the lid body 16 of the display case 7, as shown in FIG. 23.

At this time, the tray main body 3 is stably received in the box body 10 by accommodating a front surface side edge of the tray main body 3 by means of a flexible accommodating piece 17 connected to an open edge of the side walls 9 and 9 of the display case, and the sheet 2 is held by forming a C-shaped notch shown in FIG. 22 in a side edge of the lid wall 14 and inserting the side edge of the sheet 2 to a back side of a pressing piece 19 in an inner side of the notch 18.

Further, the display case 7 is maintained in a closed state by passing locking bar members 21 in both side edges of a plate-like body 20 through locking bar inserting portions 22 which are provided in a comb shape so as to protrude to inner side surfaces of the side walls 9, 9, 15 and 15 of the box body 8 and the lid body 16 and are fitted in an engaging manner so as to be arranged in series, while inserting the plate-like body 20 to an inner side from matching end edges of the bottom wall 8 and the lid wall 14 after closing the display case 7 as shown in FIGS. 24 and 25.

The structure is made such that a locking hook 24 of the plate-like body 20 is engaged with an inner locking portion 23 of the display case 7 so that the display case 7 is maintained in the closed state, thereby preventing the plate-like body 20 from being pulled up.

In this case, the plate-like body 20 can be pulled up by removing the locking hook 24 from the locking portion 23 so as to cancel the engagement relation, by fitting a pin of a canceling device (not shown) into a through hole 26 passing through the locking portion 23 and pressing back the locking hook 24 with a leading end of the pin.

In the structure obtained by combining the receiving case and the display case, since one sheet of the receiving case and the overlapped tray main body are prevented from escaping with respect to the box body of the display case, by means of the accommodating piece 17, it is necessary to turn up the accommodating piece 17 so as to fit one side of the sheet to the tray main body and to bring down the accommodating piece 17 so as to achieve an engaging relation after fitting. Accordingly, since a significant amount of trouble is experienced and the brought-down accommodating piece faces to a peripheral edge portion of the received disc (refer to FIG. 23), it is necessary to execute a troublesome operation of turning up the accommodating piece to a collision avoiding position when removing the disc, and pushing down the accommodating piece to a non-engaging position after fitting the disc. Therefore, the recording surface of the disc is scratched by the accommodating piece facing the plate surface of the disc if the disc is taken out from the receiving recess portion while the accommodating piece is kept as it is.

Further, since the end wall is continuously formed with the bottom wall of the box body via the half-cut hinge, and the lid wall of the lid body is continuously formed with the end wall via the half-cut hinge, the lid body falls down when the case is opened and closed with respect to the box body of the display case (refer to FIG. 23).

At this time, since another side of the sheet is pressed down to the inner surface of the lid wall in the lid body by the pressing piece, another side of the sheet of the receiving case falls down.

Accordingly, since the lid body is pulled up together with another side of the sheet every time the display case is closed, and the lid body then falls down so as to cover the disc, a troublesome problem is generated.

Further, the sheet and the tray main body which are fitted to the box body are slipped toward the lid body side by the sheet which is open together with the lid body upon opening of the lid body.

Accordingly, there is generated a problem that the tray main body slips during of closing the lid body and partly escaping or protruding from the box body struts so as to prevent the lid body from being smoothly closed.

SUMMARY OF THE INVENTION

Accordingly, an object of this invention is to do away with the troublesome work of pressing the side edge of the sheet in the receiving case by the pressing piece and accommodating the tray main body with the accommodating piece, and do away with the troublesome work of pushing down the lid body of the receiving case after pulling it up, only by fitting a shipping receiving case of a manufacturer to the display case in the shop. Therefore, there is no difficulty in smoothly closing the lid body.

In order to achieve the object mentioned above, in accordance with the invention, a display case is formed by a box body structured by a bottom wall and peripheral walls protruding from respective edges of the bottom wall, and a lid body provided at one edge of the box body via an appropriate hinge so as to open and close an opening of the box body, and an appropriate lock apparatus provided in the display case. The lock apparatus can not be unlocked except at the shop, and a locking part can be recovered upon unlocking.

Further, there is employed a structure in which an inner portion of the display case is provided with a receiving case formed by a box body receiving a rental commodity such as a disc or the like, and a lid body rotatably mounted via pins provided in both side wall ends of the box body, and opening and closing an opening of the box body, the box body of the receiving case is fitted to the box body of the display case, and the lid body of the receiving case is fitted to the lid body of the display case, in such a manner that the hinges are arranged in parallel and at close positions.

Further, there may be employed a structure in which the box body of the display case is provided with a movement-preventing means for preventing the pin hinge side of the box body of the receiving case from moving in an escaping direction.

Further, a display case is formed by a box body structured by a bottom wall and peripheral walls protruding from respective edges of the bottom wall, and a lid body provided at one side of the box body via an appropriate hinge so as to open and close an opening of the box body, and an appropriate lock apparatus provided in the display case. The lock apparatus can not be unlocked except at the shop, and a locking part can be recovered upon unlocking.

Further, there is employed a structure in which an inner portion of the display case is provided with a receiving case formed by a box body receiving a rental commodity such as a disc or the like, and a lid body arranged at one side of the box body via a half-cut hinge so as to open and close an opening of the box body, the box body of the receiving case is fitted to the box body of the display case, and the lid body of the receiving case is fitted to the lid body of the display case, in such a manner that the hinges are arranged in parallel and at close positions.

Further, a display case is formed by a box body structured by a bottom wall and peripheral walls protruding all sides other than the hinge side of the bottom wall, a lid body structured by a lid wall and peripheral walls protruding from the sides of the lid wall other than the hinge side, and a connection wall connected to the side having no peripheral wall via a hinge, and an appropriate lock apparatus provided in the display case. The lock apparatus can not be unlocked except at the shop, and a locking part can be recovered in accordance upon unlocking. Further, there may be employed a structure in which a receiving case is formed by a box body receiving a rental commodity such as a disc or the like, and a lid body provided at one side of the box body via a hinge so as to open and close an opening of the box body, the box body of the receiving case is fitted to the box body of the display case, in such a manner that both the hinges are arranged in parallel and at close positions, and the box body of the receiving case is set so as to be prevented from sliding with respect to the box body of the display case in a direction allowing the receiving case to fall out of display case, via a movement preventing means.

Further, there may be employed a structure in which the box body of the display case is provided with a locking means for preventing the box body of the receiving case from escaping.

Further, an anti-theft tag can be provided in the locking part, or a notch portion leaving open the display case by pressing or hooking a fitted fingertip is provided in a predetermined position in a periphery of the display case.

As described above, in accordance with the anti-theft device for use with a rental commodity of the present invention, since the display case is prevented from being left open during display in the shop, by the lock apparatus, it is possible to prevent the commodity such as the disc within the display case from being stolen by being taken out from the receiving case. Further, since the locking part is recovered after unlocking of the lock apparatus at the shop upon rental, the display case is not locked even in the case that the display case is used as a rental case, whereby the disc is not prevented from being taken in and out. Further, since the display case is not left at the shop, it is not necessary to undergo the trouble of storing and arranging the display case at the shop.

Further, when leaving open the lid body of the receiving case, the lid body is prevented from falling down to the lid body side of the display case by the peripheral wall of the box body in the display case side so as to remain in an upright condition.

Accordingly, it is possible to do away with the labor that the lid body of the receiving case is pushed down after being pulled up upon closing of the receiving case.

Further, since the structure is such that the box body of the receiving case fitted to the box body of the display case is prevented from slipping, by the movement preventing means, the box body of the receiving case does not slip in the direction of the lid body of the display case from the inner side of the box body of the display case, even in the case that the lid bodies of the display case and the receiving case are independently or simultaneously opened.

Accordingly, no trouble is generated upon closing of the lid body of the display case, and the lid body can be smoothly closed. Further, since the portion having no peripheral wall in the box body and the lid body of the display case is closed by the connection wall under the condition that the display case is closed, there is obtained an effect of preventing the receiving case from falling out of the display case.

Further, since the receiving case is prevented from falling out of the box body of the display case, by the movement preventing means or the locking means, the lid body of the receiving case can be smoothly opened.

Further, since the anti-theft tag is provided in the locking part recovered at the shop, it is unnecessary to execute a shielding operation which takes a lot of effort, when the rental commodity is being taken from the shop after rental.

Further, only the display case can be opened or the display case and the receiving case can be simultaneously opened by pressing or hooking the fitted fingertip to the notch portion so as to open.

BRIEF DESCRIPTION OF THE DRAWINGS

FIG. 9 is a vertical cross sectional enlarged front elevational view showing a hinge portion;

FIG. 10 is a vertical cross sectional enlarged front elevational view showing an open state of the portion mentioned above;

FIG. 14 is a partly notched front elevational view of the same;

FIG. 15 is a partly notched plan view showing a main portion of the portion mentioned above;

FIG. 16 is a partly notched front elevational view showing a locking means for preventing from getting out;

FIG. 17 is a partly notched front elevational view showing another locking means;

DESCRIPTION OF THE PREFERRED EMBODIMENTS

Figure 1:
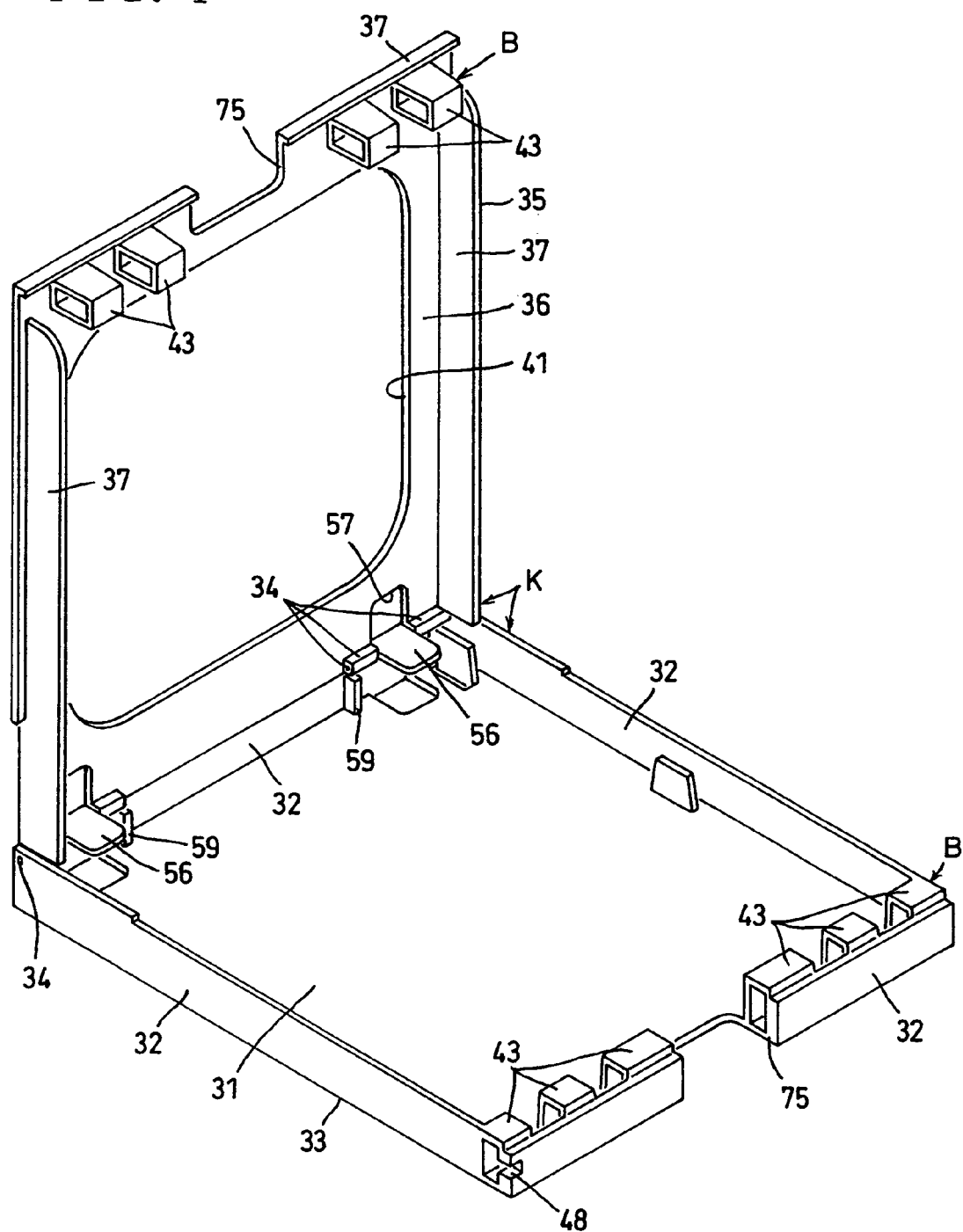
FIG. 1 is a perspective view of a display case showing an embodiment in accordance with the invention.

A description will be given of embodiments in accordance with the invention with reference to the accompanying drawings.

In a first embodiment in accordance with the invention, as shown in FIGS. 1 to 6, a display case K is formed by a box body 33 structured by a bottom wall 31 and a peripheral wall 32 protruding from an inner surface of the bottom wall 31 from each of edge of the bottom wall 31, and a lid body 35 provided at a rear edge of the box body 33 via an appropriate hinge 34 so as to open and close an opening of the box body 33.

Figure 6:
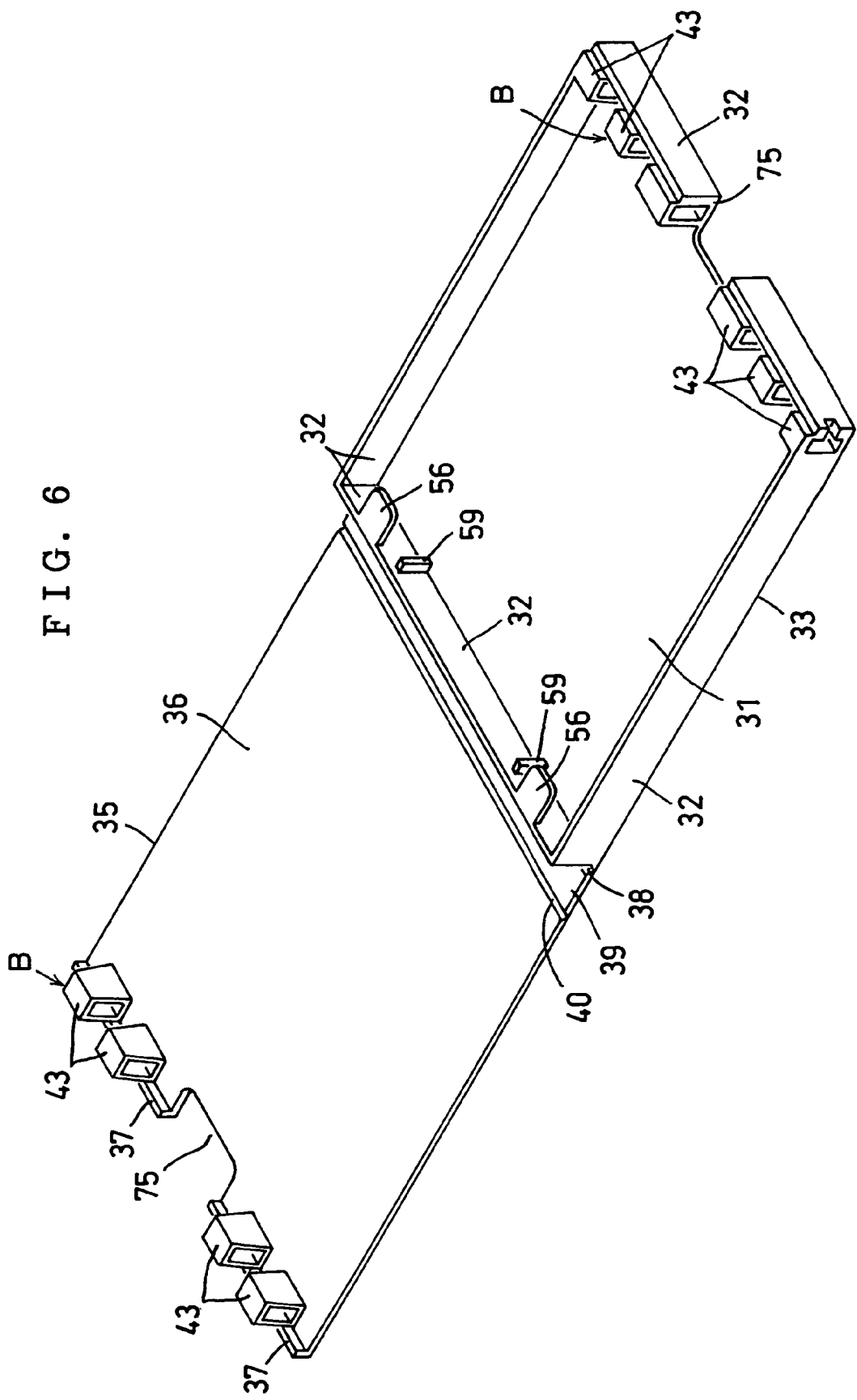
FIG. 6 is a perspective view showing another embodiment of the display case.
Figure 7:
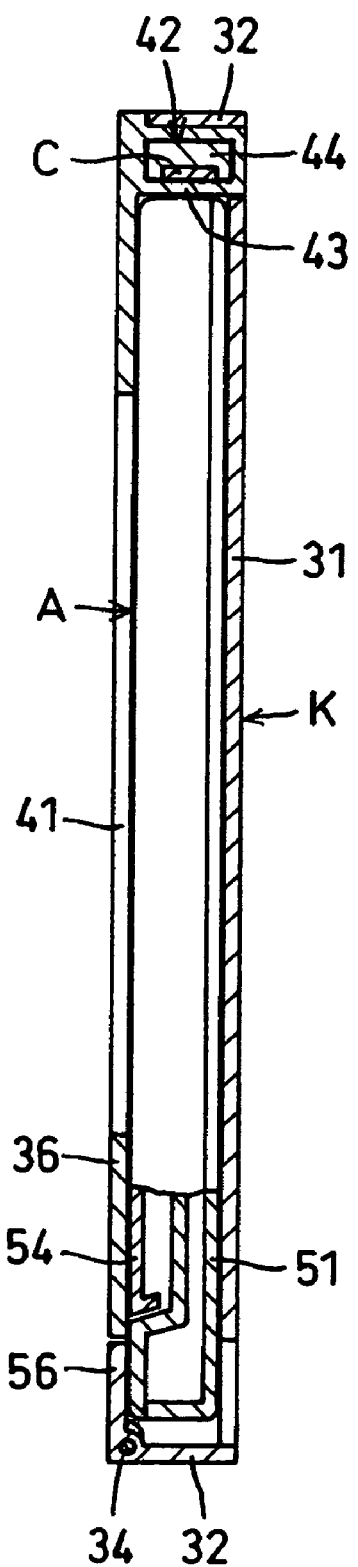
FIG. 7 is a partly notched front elevational view of the display case and the receiving case fitted to each other.

The lid body 35 mentioned above is structured by a lid wall 36, and a peripheral wall 37 protruding from the edges other than the edge of the lid wall 36 adjacent the hinge 34. The hinge 34 mentioned above is formed by tube portions which are provided in a comb shape at the edge of the lid wall 36 not having the peripheral wall 32, and a pin inserted through the tube portions. However, the hinge 34 is not limited to a pin hinge. For example, as shown in FIG. 6, the hinge structure can include a connection wall 39 which is continuous with the bottom wall 31 via a half-cut hinge 38, and is continuous with the lid wall 36 of the lid body 35 via a half-cut hinge 40. The connection wall 39 is contacted with the outside of the peripheral wall 32 when the lid body 35 is closed over the box body 33. However, the structure is also not limited to this example. For example, the structure may be made such that the lid wall 36 of the lid body 35 is continuously formed in an open edge of the peripheral wall 32 via a half-cut hinge (not shown).

Of course, the peripheral wall 37 of the lid body 35 is not limited to being disposed at the three edges (shown in FIG. 1) other than the edge at the hinge 34 or 40, but can be constituted provided only at the edge opposite the hinge 40 (which does not correspond to the structure provided in both sides shown in FIG. 6).

In the case that a molded synthetic resin of the display case K is semi-transparent or opaque, the receiving case A received in the display case K can not be seen through. Accordingly, it is preferable that a through window 41 having an appropriate shape is provided in only the lid wall 36 or both the lid wall 36 and the bottom wall 31 so as to allow viewing therethrough.

Further, a lock apparatus B is provided at a desired edge of the display case K. The lock apparatus B is provided so as to be unlocked from the other sides than a shop side as shown in FIG. 4, and such that a locking part 42 can be removed at the shop by an unlocking operation in the shop.

The lock apparatus B mentioned above, for example, as shown in FIGS. 1 to 6, includes tubular bodies 43 provided at one edge of each of the box body 33 and the lid body 35 so as to be alternately fitted to each other in a closed condition of the lid body 35 so as be arranged in series in a fitted state, and a slider 44 serving as the locking part 42 shown in FIG. 4. The locking part 42 is inserted through the tubular bodies 43 arranged in series. Accordingly, the slider 44 serves as a locking bar so as to inhibit the lid body 35 from being left open with respect to the box body 33, and it is possible to inhibit removal of the slider 44 except at the shop due to an engagement relation between one locking portion 45 and another locking hook 46 which are provided in opposing surfaces of the slider 44 and the tubular body 43 as shown in FIG. 5. In other words, the engagement relation is set such that the locking hook 46 prevents the locking bar from being pulled back out by being caught on the locking portion 45 upon full insertion of the slider 44. The above arrangement is the illustrated case, but the engagement relation may also be achieved manually. The engagement relation is cancelled at the shop and the slider 44 serving as the locking part 42 is recovered at the shop, for example, by magnetically attracting the locking hook 46 made of iron, thereby canceling the engagement between the locking hook 46 and the locking portion 45 and allowing the slider 44 to be pulled out.

Figure 4:
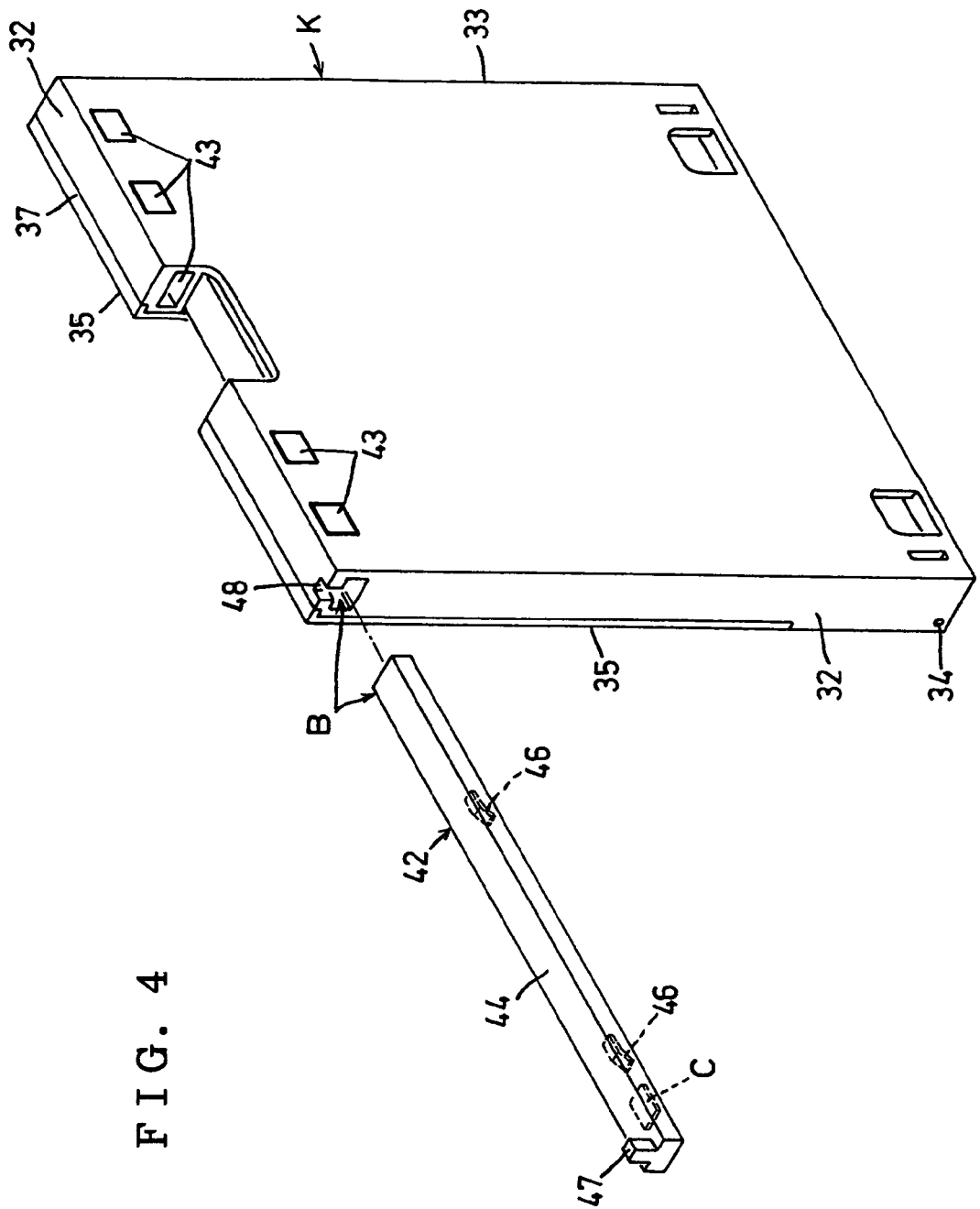
FIG. 4 is a perspective view showing a portion of a lock apparatus.
Figure 5:
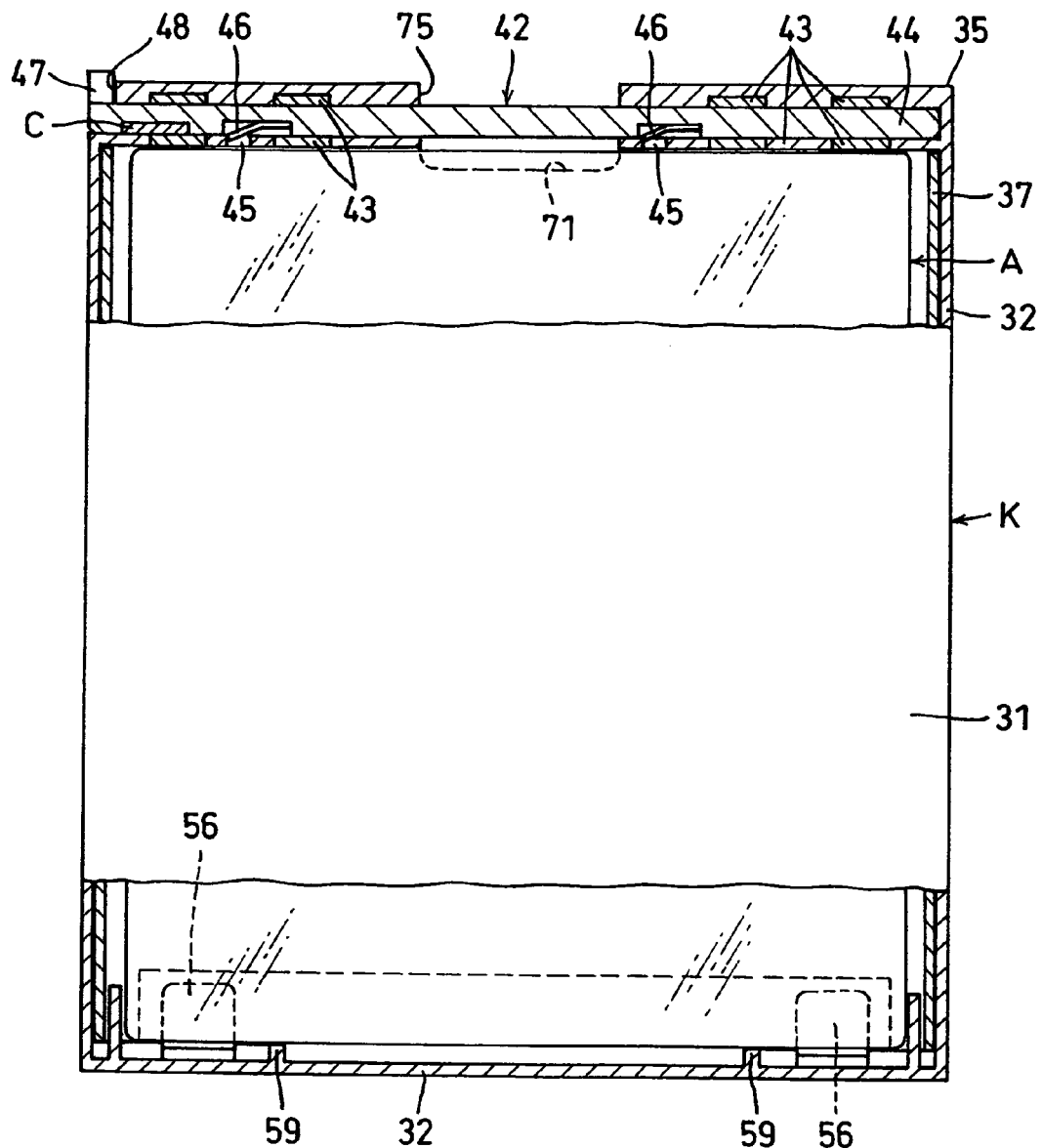
FIG. 5 is a partly notched side elevational view of the portion mentioned above.

In this case, as shown in FIGS. 4 and 5, a projection 47 protruding upwardly in the drawing from a terminal end of the slider 44 is inserted and fitted into a notch 48 provided in an end edge of the tubular body 43 so as to form an insertion stopper of the slider 44. In addition, the projection 47 is brought into contact with a magnetic canceling device (not shown) and thereafter the display case K or the canceling device is slid. At this time, when sliding the canceling device while holding the display case K or sliding the display case K while holding the canceling device, the slider 44 is pulled out due to an engagement of the projection 47.

Figure 12:
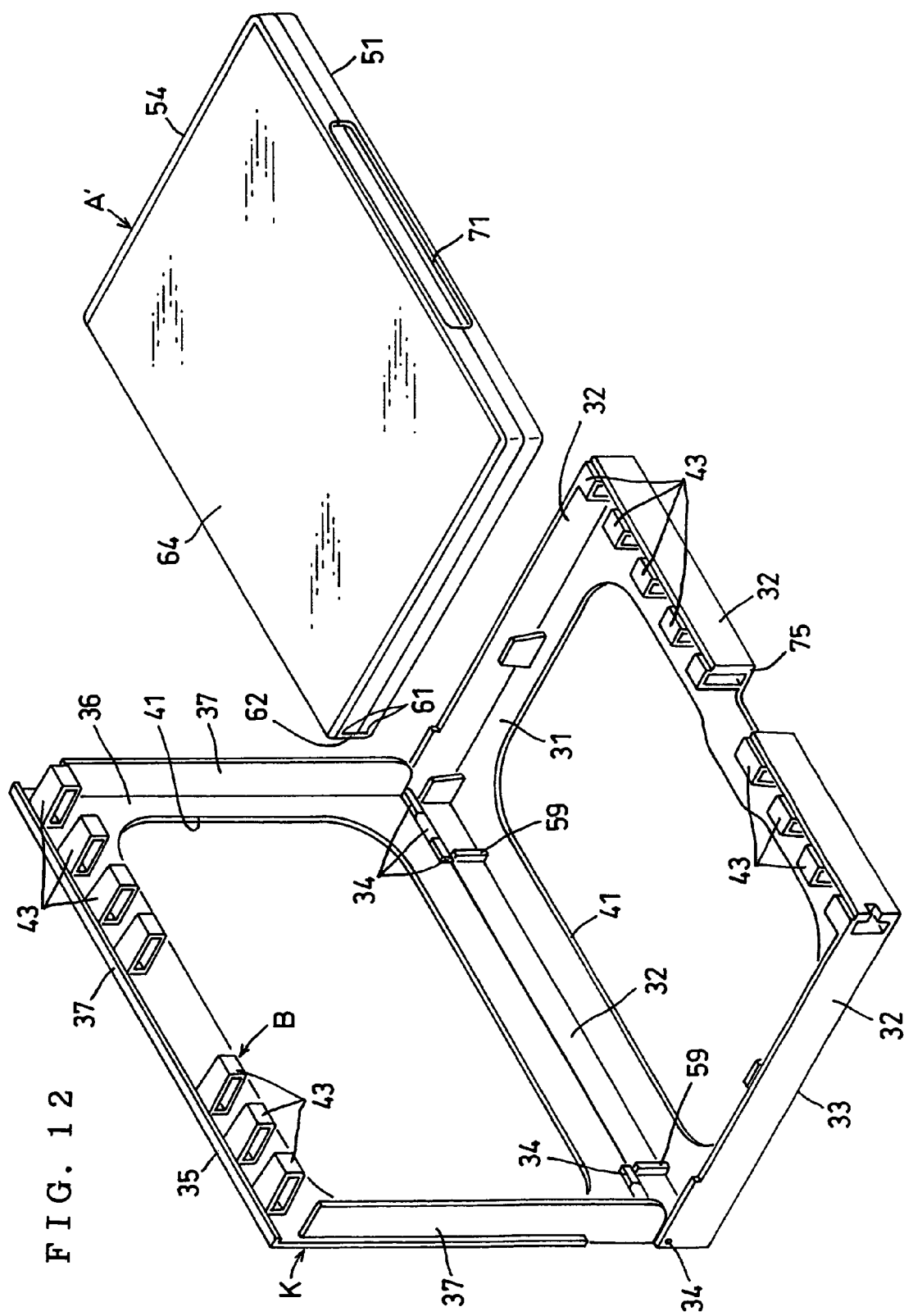
FIG. 12 is a perspective view showing a combination of another receiving case.

Of course, the canceling device is not limited to the magnetic type, but can employ a system of canceling the engagement relation between the locking hook 46 and the locking portion 45 while pushing back the locking hook 46 by pressing a projection or a protruding shaft of the canceling device at the shop, or a system, for example, shown in FIG. 12 of Japanese Patent Application No. 2000-345923.

As an alternative lock apparatus B, for example, there is a lock apparatus in which a tubular body is provided in one of the peripheral walls 32 and 37 of the box body 33 and the lid body 35, an L-shaped hook piece is provided in the other of the peripheral walls 32 and 37, and a hook piece is inserted and fitted into the tubular body from a through window of the tubular body in a closing operation of the display case K, whereby the hook piece is caught on the slider by inserting the slider serving as the locking part so as to maintain a closed state of the display case K.

Of course, the locking portion 45 and the locking hook 46 having the same engagement relation as mentioned above are provided in the opposing surfaces of the slider, and the tubular body.

In this case, as the structure of an alternative lock apparatus B, it is possible to appropriately select and use a structure disclosed in Japanese Patent Application No. 10-34929, a structure disclosed in Japanese Patent Application No. 11-212589, a structure disclosed in Japanese Patent Application No. 2000-190291 or the like.

In fact, it is preferable that the structure is such as to allow the receiving case A of the disc to be put in the display case K so as to close the display case K, and thereafter lock the lock apparatus B at the shop, and recover the locking part 42 used for unlocking at the shop side upon a rental at the shop.

As a result, since the locking part 42 does not exist in the converted rental display case K, the display case K is not locked at a time of handling.

Figure 2:
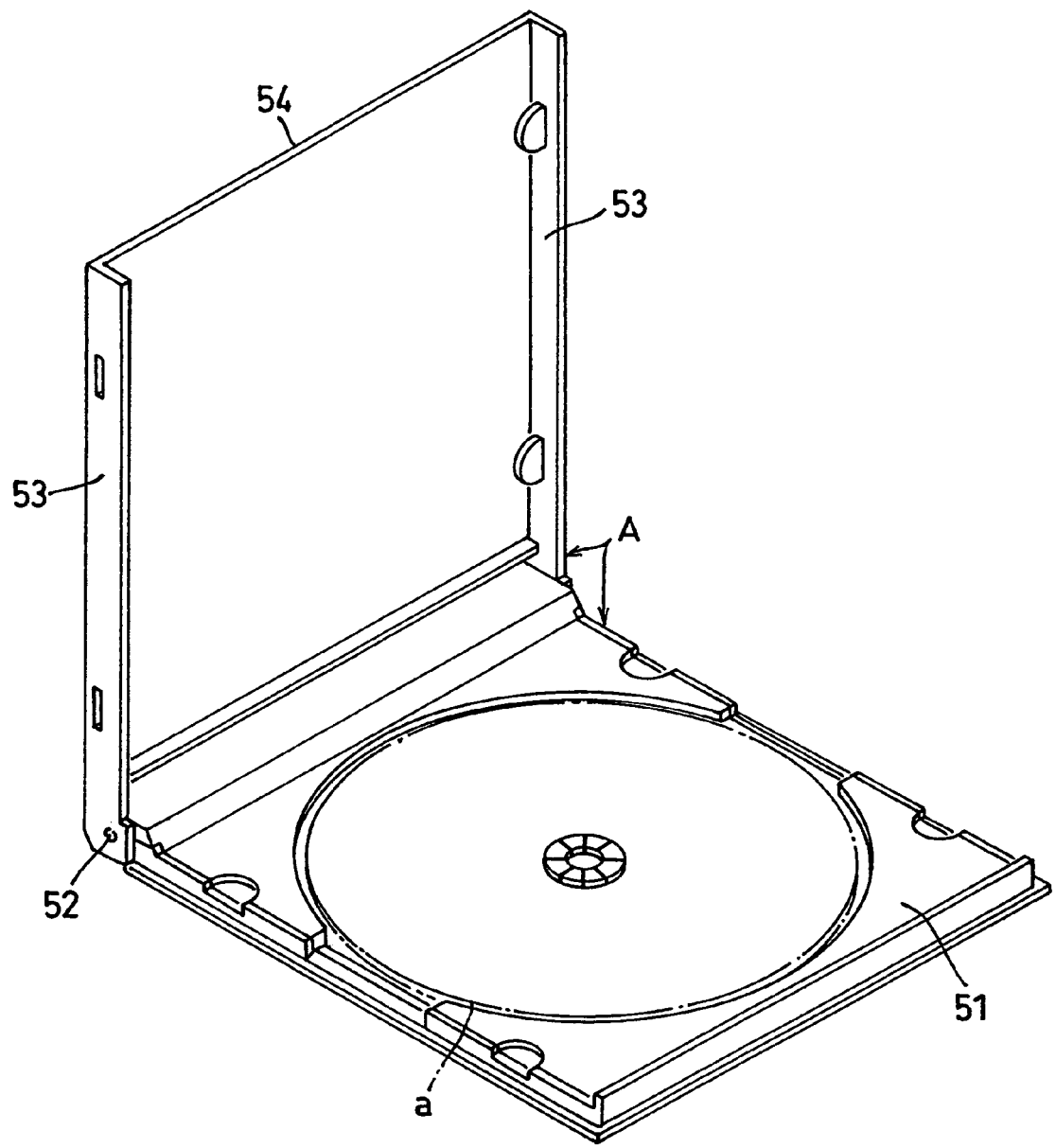
FIG. 2 is a perspective view of a receiving case.

As shown in FIG. 2, the receiving case A received in the display case K is structured by a box body 51 receiving the disc a, and a lid body 54 having side walls 53 and 53 with end portions rotatably mounted to both side wall ends of the box body 51 via a pin 52.

Further, the box body 51 of the receiving case A is fitted to the box body 33 of the display case K, and the lid body 54 is fitted to the lid body 35.

At this time, the hinge 34, or 38 and 40, of the display case K and the pin 52 of the receiving case A are set in a parallel state and at a close position.

Then, the lid body 35 of the display case K is opened, and the lid body 54 of the receiving case A is next opened.

The lid bodies 35 and 54 can be simultaneously opened as mentioned.

Figure 8:
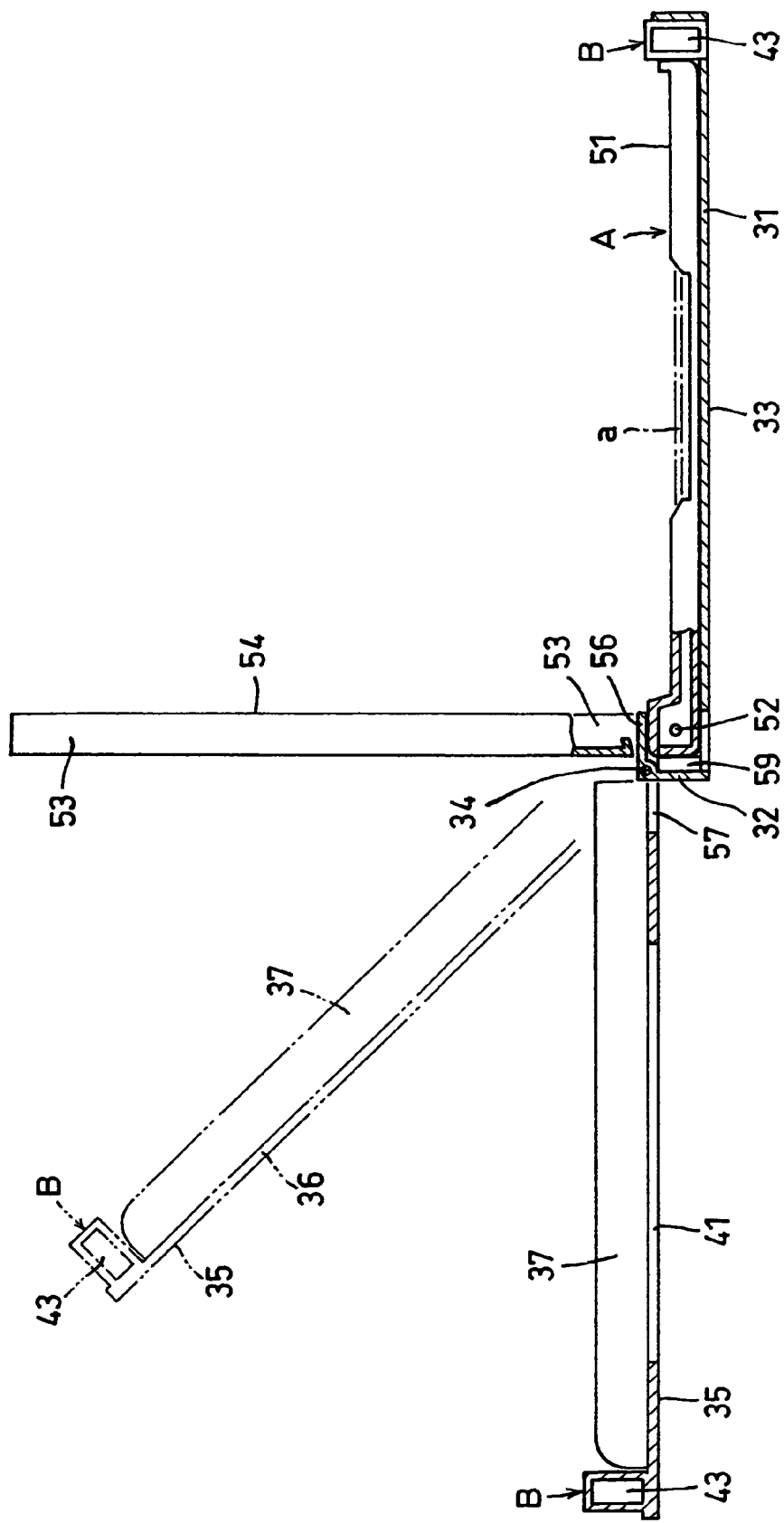
FIG. 8 is a partly notched front elevational view showing an open state of the portion mentioned above.
Figure 11:
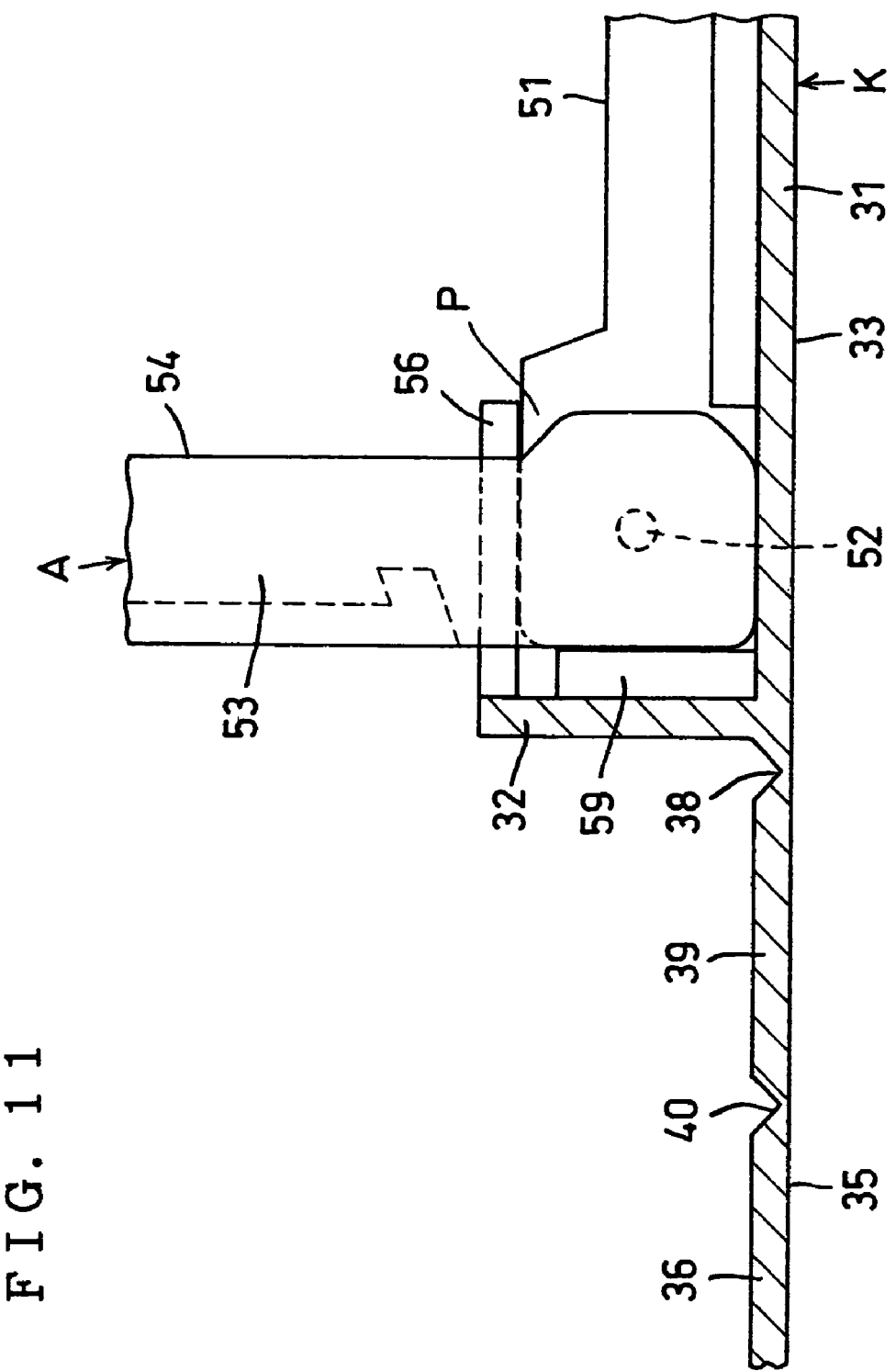
FIG. 11 is a partly notched front elevational view showing an open state of the receiving case mentioned above.

The opened lid body 54 is brought into contact with the peripheral wall 32 of the box body 33, and does not fall down in a direction (rearwardly, away from box body 51) of the fallen lid body 35 from a solid line position in FIG. 8 after having being opened upwardly. Further, when the lid body 54 is raised upwardly about the pin 52, an end edge of the side wall 53 contacts with an inner surface of the bottom wall 31 as shown in FIG. 11 so as to prevent the lid body from falling down.

Accordingly, the closing operation of the lid body 54 of the receiving case A can be achieved by only pushing the lid body 54 down from the upward position, instead of the conventional troublesome operation of pulling up the lid body from above the lid body 35 and then pushing the lid body down to the closed position, so that the closing operation can be smoothly performed.

Figure 3:
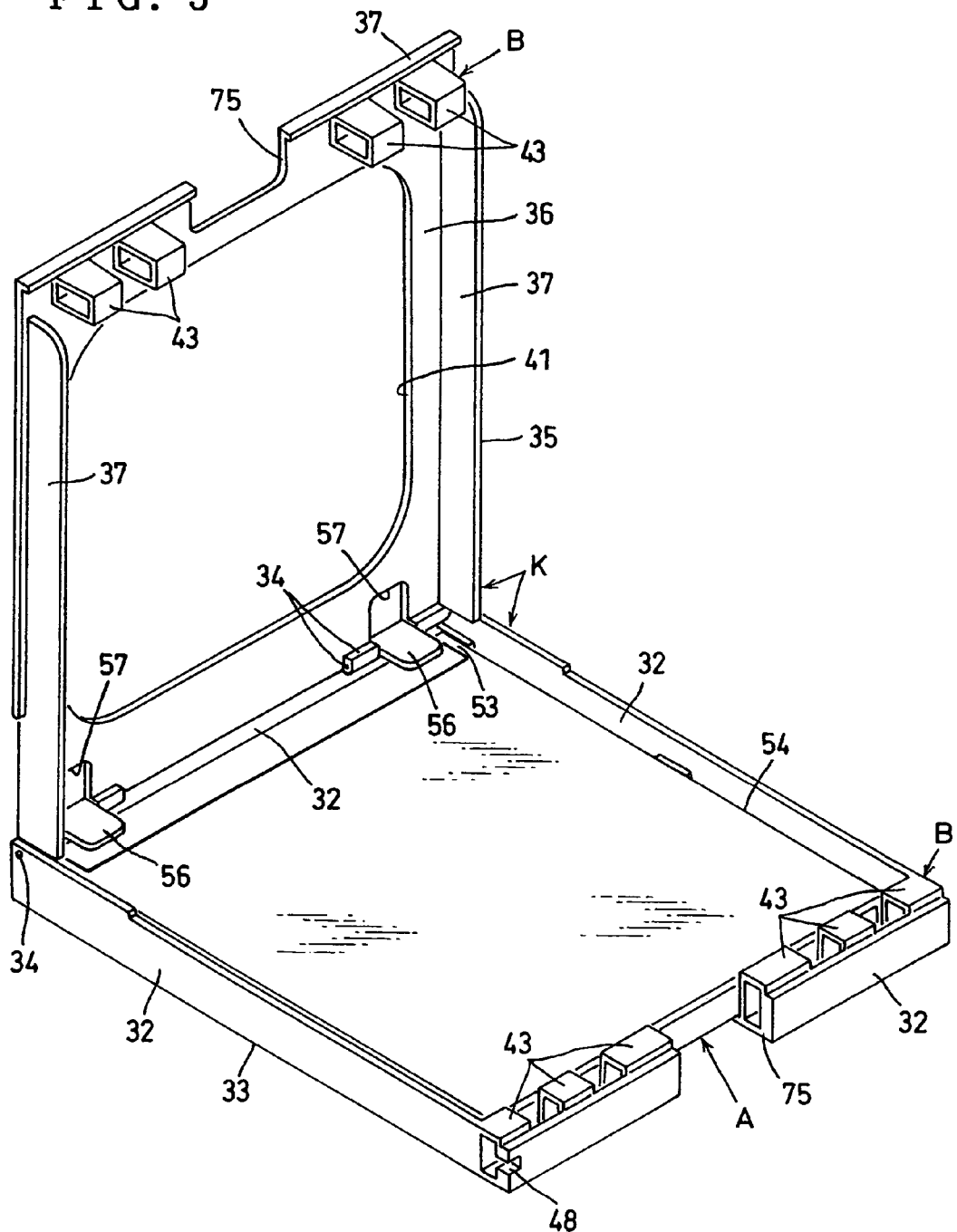
FIG. 3 is a perspective view of a state in which the receiving case is fitted to the display case.

In accordance with a second embodiment of the invention, as shown in FIGS. 1, 3 and 8, the structure is made such that the pin 52 side of the hinge of the box body 51 in the receiving case A is prevented from getting out by a movement preventing means 56, within the box body 33 of the display case K.

Accordingly, the box body 51 does not come out of the box body 33 upon opening of the lid body 54 of the receiving case A, and it is possible to smoothly open the lid body 54.

The movement preventing means 56 mentioned above is provided by a protrusion which opposes the bottom wall 31 and is continuous with the upper edge of the peripheral wall 32, in the illustrated case, however, an independent part may be mounted.

In fact, it is possible to prevent the box body 51 from coming out of the box body 33 by pressing the pin 52 side of the hinge in the box body 51.

Of course, the peripheral wall 32 having the movement preventing means 56 may be present only at a necessary location, for example, only a location having the movement preventing means 56, in place of being present along the entire length of the illustrated bottom wall 31.

Further, since the movement preventing means 56 mentioned above accommodates (presses) the box body 51 at a location at P (FIG. 11) the hinge area of the box body 51, the movement preventing means 56 holds only the box body 51 and not the lid body 54, because protruded ends of both of the side walls 53 of the lid body 54 are pivotally mounted to the side wall of the box body 51 via the pin 52, and the movement preventing means 56 are disposed between the protruded ends of the side walls 53.

Reference numeral 57 in the drawings denotes a window formed in the lid wall 36 for forming a piece of the movement preventing means 56.

In accordance with a third embodiment of the invention, an anti-theft tag C is provided in the locking part 42 that is removed and retained in the shop.

The tag C has a specific ID code as is well known (for example, in Japanese Patent Application No. 11-338353), and is structured such that a resonance circuit resonates on the basis of generation of a high-frequency electromagnetic field placed in an entrance door so as to modulate the high-frequency electromagnetic field upon transmission of the specific ID code if the locking part 42 with the tag C passes through the entrance door of the shop, thereby indicating that the locking part with the tag C is being removed from the shop.

Accordingly, it is possible to inhibit the commodity displayed on the shelf in the shop in a locked condition of the lock apparatus B from being removed from the shop, and the troublesome shielding operation of the display case K and the article (a bag or the like) are not required by removing and retaining the locking part 42 in the shop when unlocking the display case K for rental.

Reference numeral 59 in FIGS. 8 to 11 denotes a protruding portion provided in the inner surface of the peripheral wall 32 adjacent the hinges 34 and 38 of the box body 33. The protruding portion 59 forms a gap between the peripheral wall 32 and the box body 51 by this protruding portion 59, thereby avoiding the strut between the pin 52 side end edge of the side wall 53 in the opening and closing lid body 54 and the peripheral wall 32 and securing a smooth opening and closing operation of the lid body 54.

In accordance with a fourth embodiment of the invention, as shown in FIG. 12, a receiving case A' received in the display case K in accordance with the first embodiment is structured by the box body 51, and the lid body 54 which is attached to the box body 51 along one peripheral edge of the box body 51 via a connection wall 62 constituting a peripheral wall along the hinge side of each of the box body 51 and the lid body 54.

The connection wall 62 is formed continuously with a bottom wall 63 of the box body 51 via a half-cut hinge 61, and is formed continuously with a lid wall 64 of the lid body 54 via another half-cut hinge 61 (for example, formed of a synthetic resin), as shown in FIG. 14. However, it is possible to provide the connection wall 62 with only the half-cut hinge 61 at an upper edge (i.e. provide only the half-cut hinge 61 between the connection wall 62 and the lid body 54).

Since the structure of the display case K receiving the receiving case A', and the structure of the lock apparatus B (having the tag C provided in the locking part 42) are the same as those of the first embodiment, and the operations and the effects of the locking and unlocking are the same, a further description will be omitted.

Accordingly, since the lid body 54 of the receiving case A' has the half-cut hinge 61, the lid body 54 does not fall down from an upright condition in the opening direction, during opening the receiving case A', in the display case K.

Accordingly, it is possible to do away with the troublesome labor of pulling up the lid body 54 and next pushing down the lid body 54 in the closing direction.

Further, a locking means S for preventing the box body 51 from falling out of the box body 33 is provided in the box body 33 of the display case K and the box body 51 fitted to the box body 33.

Figure 13:
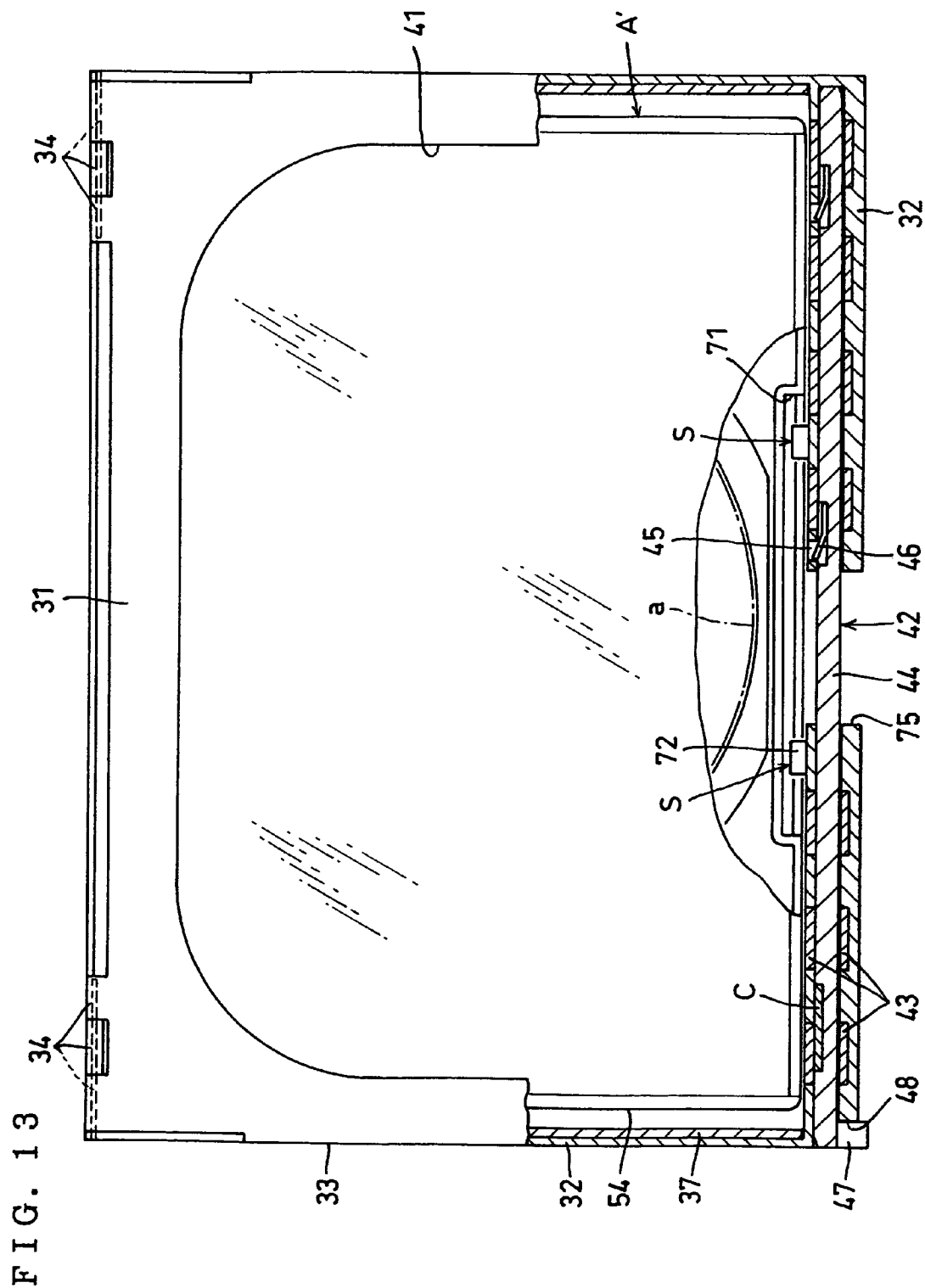
FIG. 13 is a partly notched plan view of the portion mentioned above.

The locking means S mentioned above is structured such that a locking relation is achieved by fitting a recess portion 71 in one surface around the receiving case A' to a protruding piece 72 protruding from an inner surface of the peripheral wall 32 of the display case K as shown in FIGS. 13 and 14 when the box body 51 is fitted into the box body 33, whereby the box body 51 does not fall out of the box body 33 upon opening of the lid body 54.

Further, in addition to the structure mentioned above, the structure may be made such that a projection 74 in the peripheral wall of the box body 33 is fitted and locked to a hole 73 in the peripheral wall of the box body 51, as shown in FIGS. 15, 16 and 17.

At this time, the hole 73 and the projection 74 may be provided only in one of the opposing peripheral walls of the box body 33 in FIG. 16, or may be provided in both the opposing peripheral walls as shown in FIG. 17.

In fact, the structure may be made such that it is possible to inhibit the box body 51 from falling out of the box body 33 upon opening of the lid body 54.

Accordingly, the box body 51 does not fall out of the box body 33 upon opening of the lid body 54, and it is possible to smoothly open the lid body 54.

Further, a protruding portion 59 is provided also in an inner surface of the display case K receiving the receiving case A' in accordance with a fourth embodiment or in the side of the half-cut hinge 61.

In accordance with a fifth embodiment of the invention, a notch portion 75 to which a fitted fingertip is pressed or hooked so as to open only the display case K or both the display case K and the receiving cases A and A' is provided in a desired position, for example, in the wall 32 opposing the hinge 34 or in both side walls on opposing sides of the hinge 34, around the display case K receiving the receiving case A in accordance with the first embodiment and the display case A receiving the receiving case A' in accordance with the fourth embodiment.

The notch portion 75 mentioned above is formed by notching only the peripheral walls 32 and 37, the portion from the peripheral walls 32 and 37 to the bottom wall 31, or a part of a portion from the peripheral wall 32 to the lid wall 36.

Figure 18:
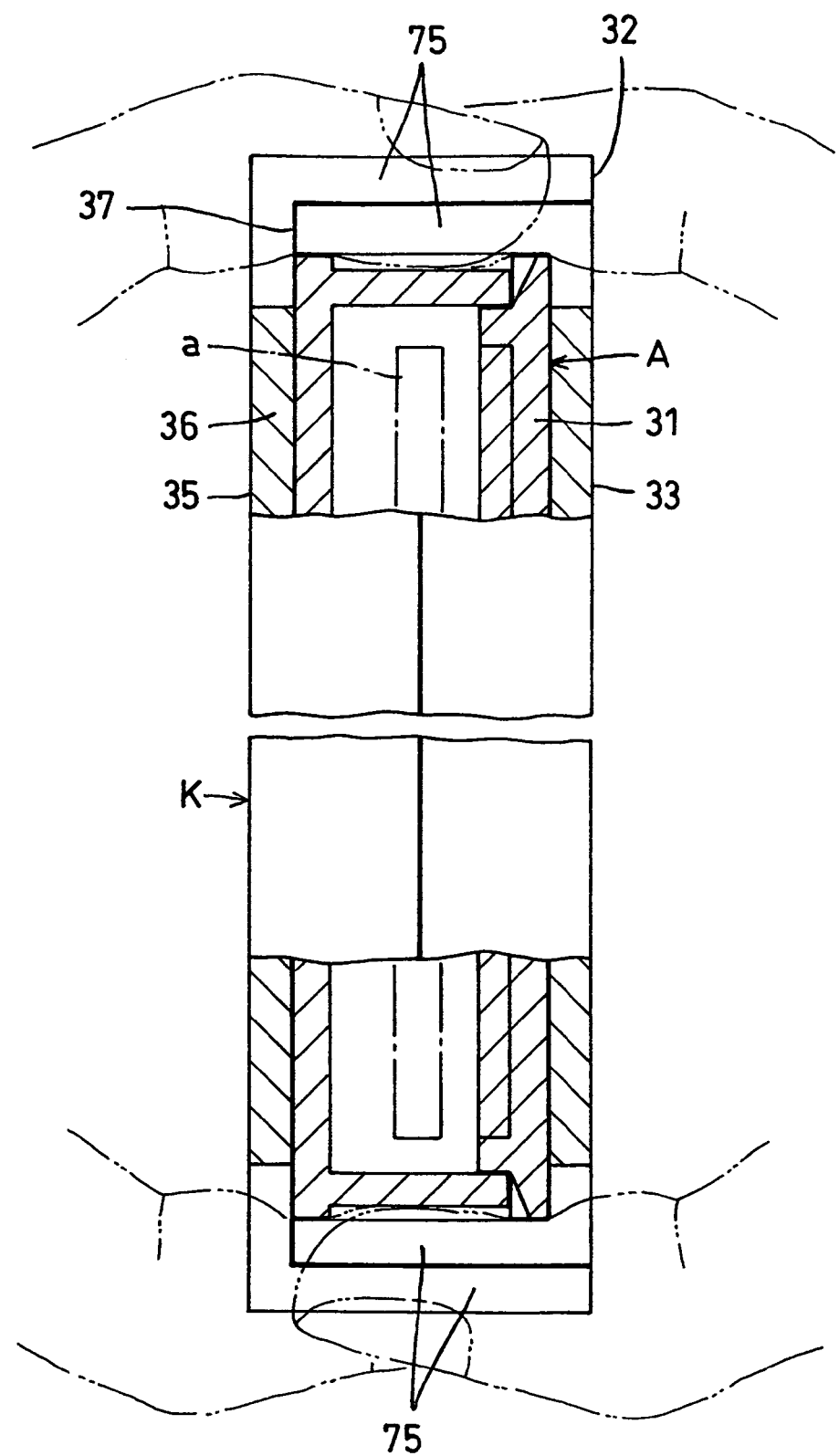
FIG. 18 is a partly notched front elevational view showing an opening operation state.

Accordingly, as shown in FIG. 18, it is possible to open while picking up the edge of the notch portion 75 by the fingertip or pressing a palm surface of the finger to the edge or the peripheral wall of the box body 51 or the lid body 54 of the receiving case A' or A.

In this case, the commodity may be constituted by another rental commodity, for example, a video tape or the like, or the commodity received in the receiving cases A or A', in place of the disc a.

Figure 19:
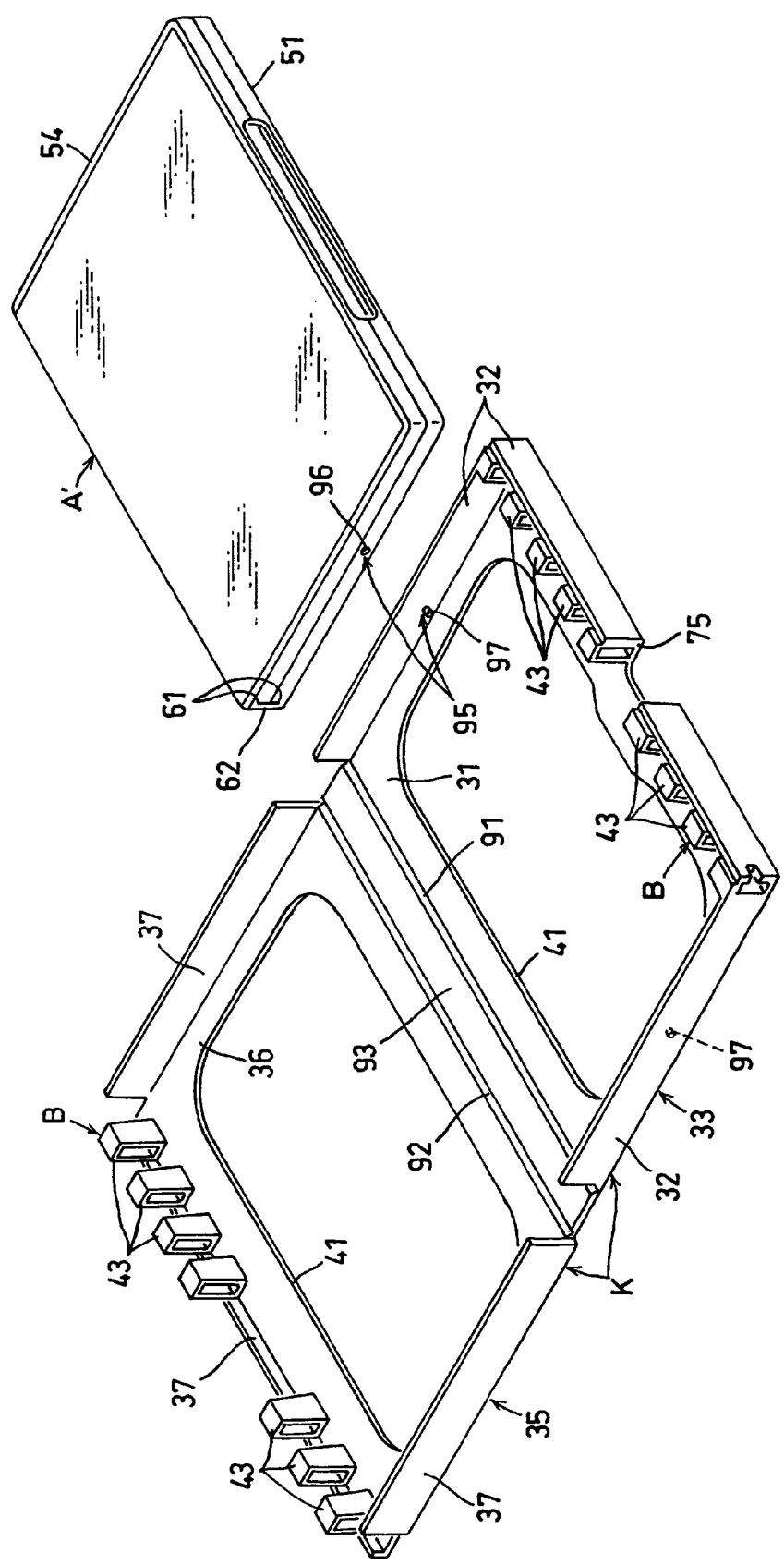
FIG. 19 is an exploded perspective view showing a sixth embodiment.
Figure 20:
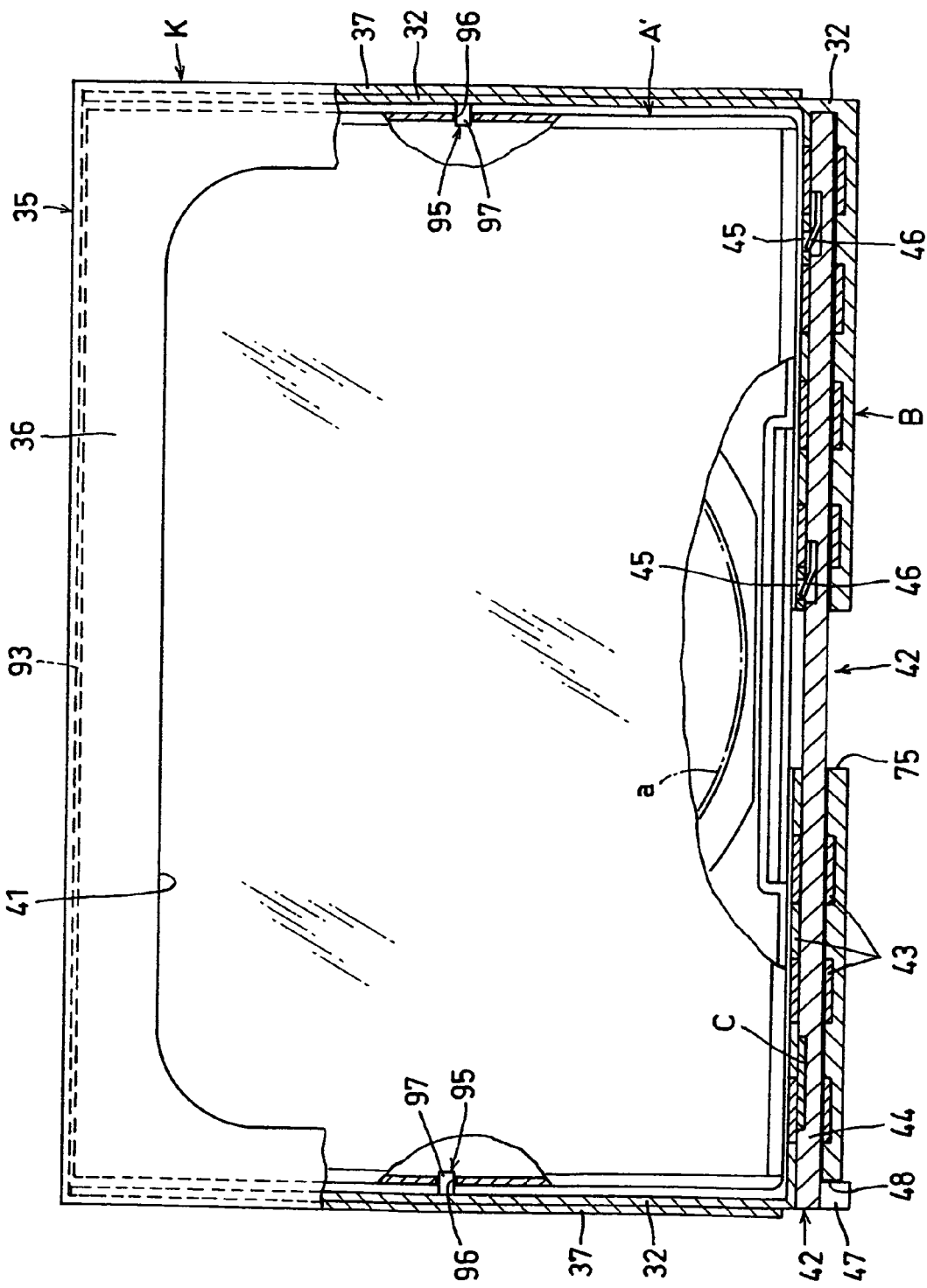
FIG. 20 is a partly notched plan view of a state in which the receiving case is assembled in the display case.
Figure 21:
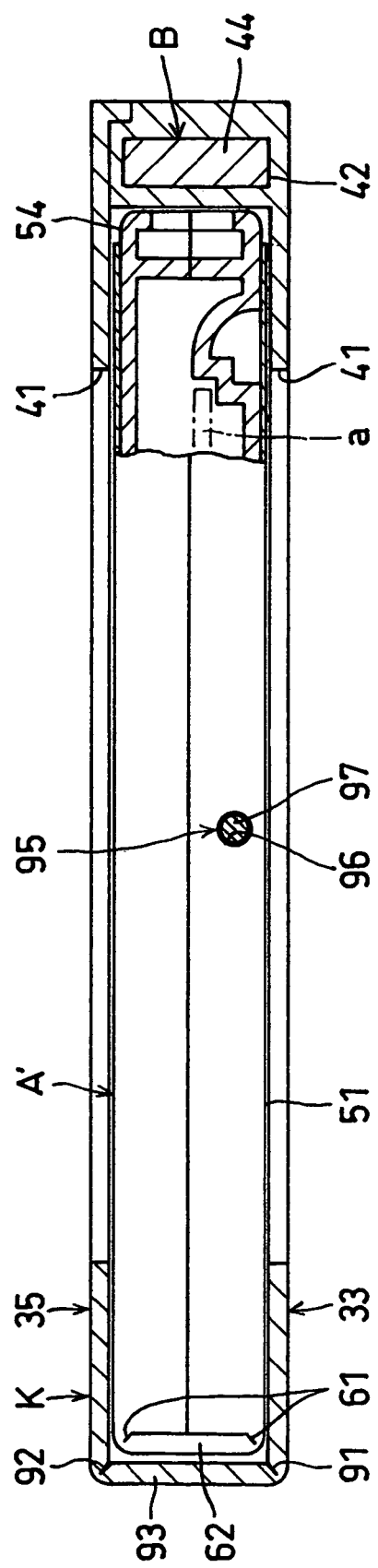
FIG. 21 is a partly notched side elevational view of the portion mentioned above.
Figure 22:
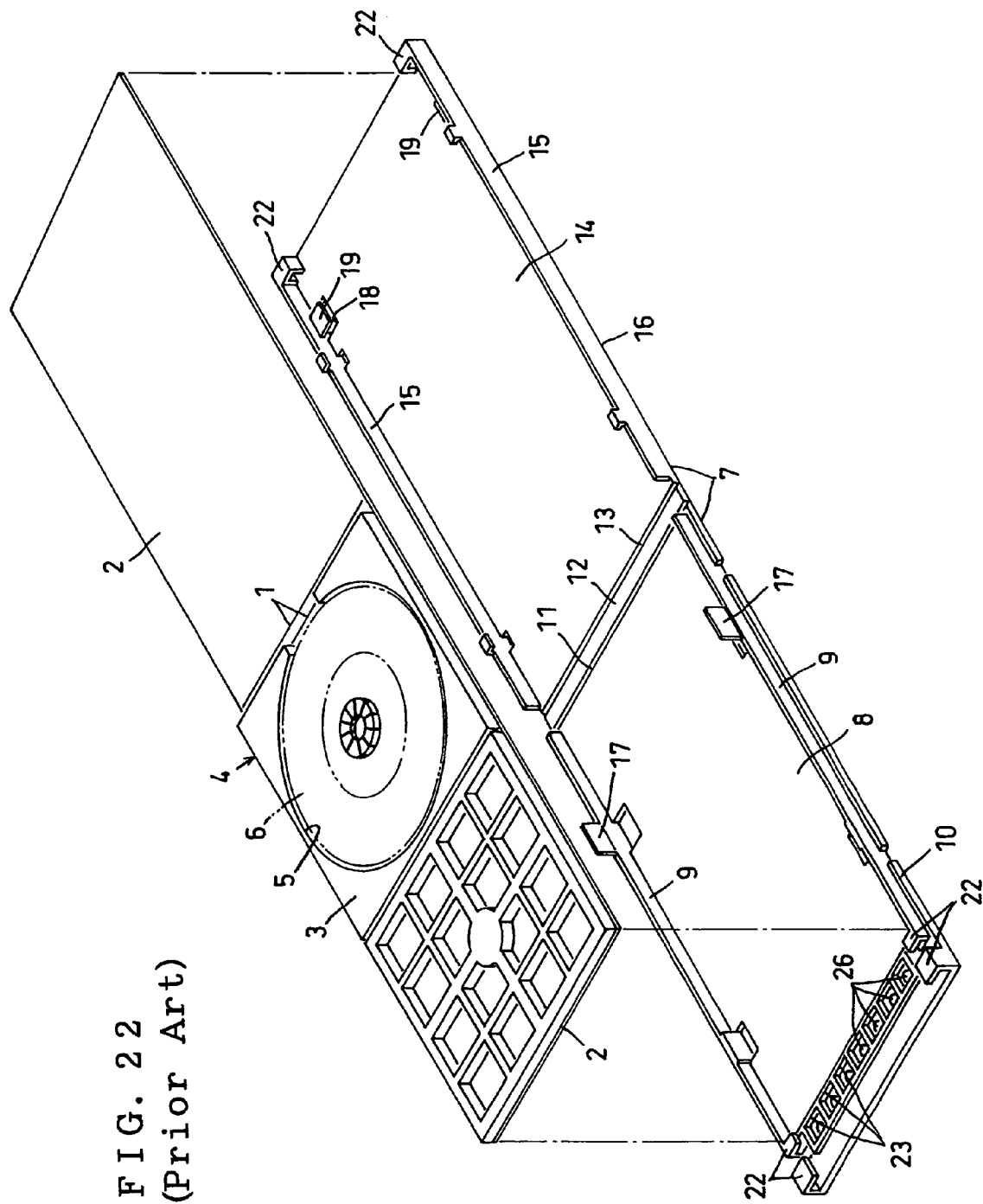
FIG. 22 is an exploded perspective view of a conventional product.
Figure 23:
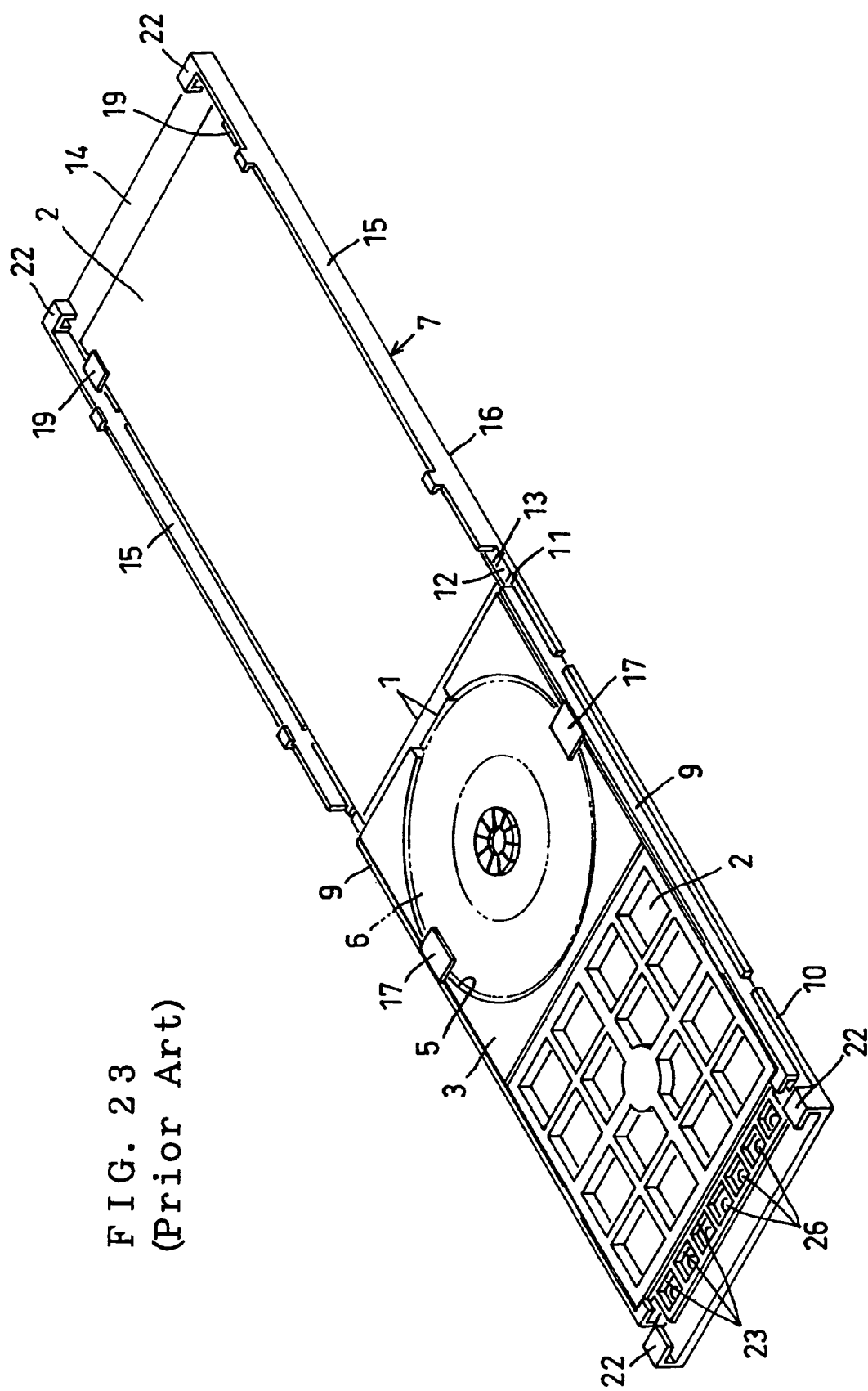
FIG. 23 is a perspective view showing a combination of the portion mentioned above.
Figure 24:
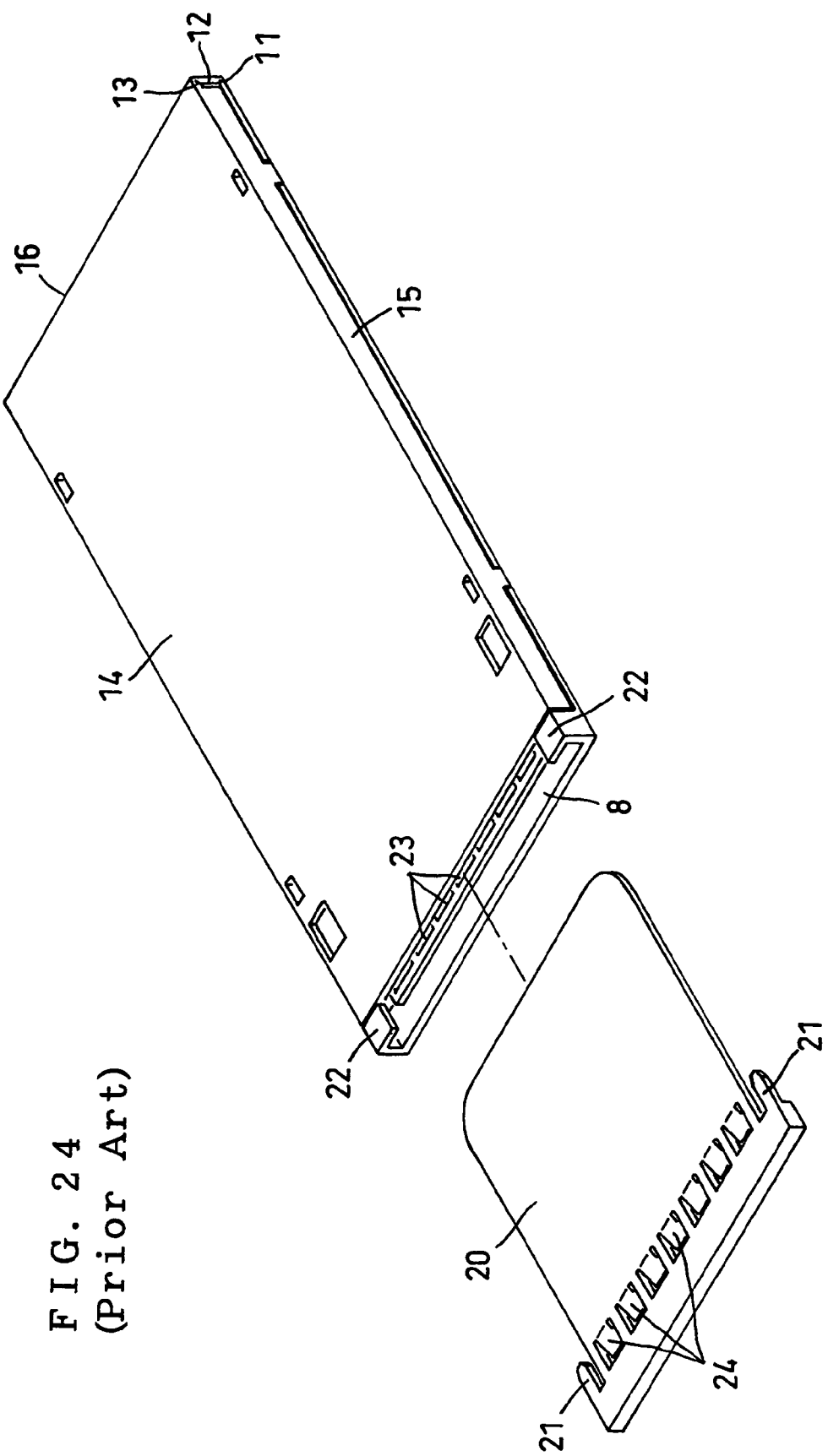
FIG. 24 is a perspective view showing a portion for inhibiting the display case from being opened.
Figure 25:
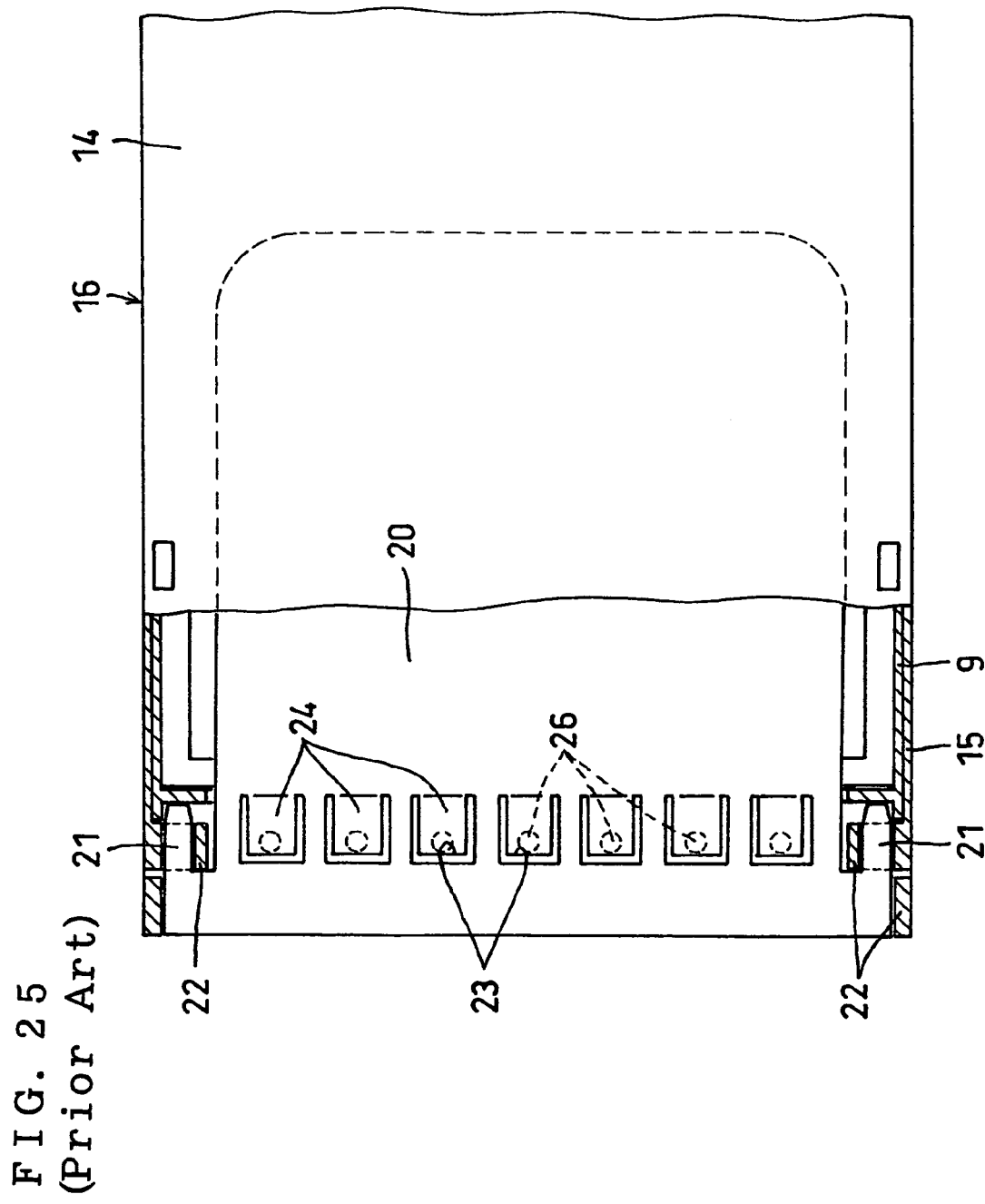
FIG. 25 is a partly notched plan view of the portion mentioned above.
Figure 26:
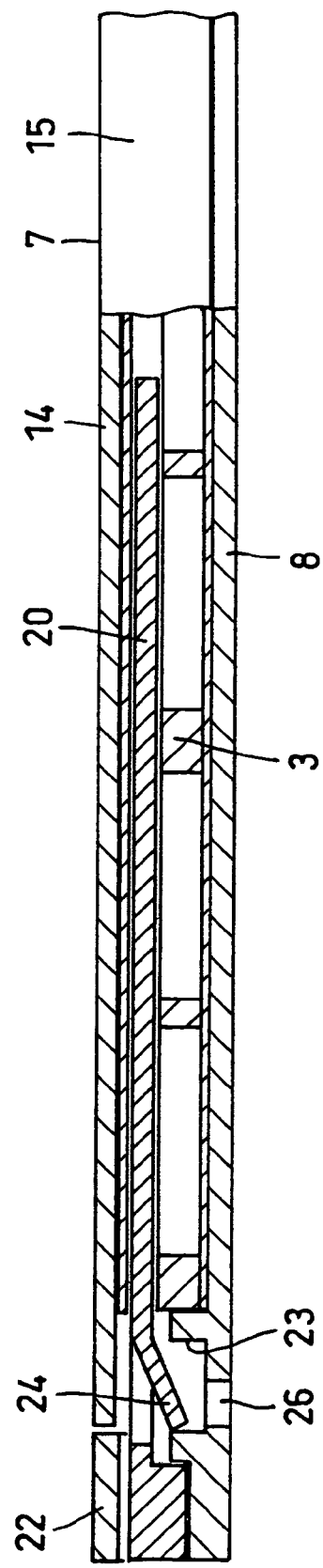
FIG. 26 is a partly notched front elevational view of the same.

In accordance with a sixth embodiment of the invention, as shown in FIGS. 19 to 21, the display case K is formed by the box body 33 structured by the bottom wall 31, and the peripheral wall 32 continuously protruding from all but one of the side edges of the bottom wall 31, the lid body 35 structured by the lid wall 36 and the peripheral wall 37 continuously protruding from all but one of the side edges of the lid wall 36, and a connection wall 93 connected to the side edges of the bottom wall 31 and the lid wall 36 that have no peripheral walls via hinges 91 and 92.

The peripheral wall 37 mentioned above is structured such as to be disposed on an outer side of the peripheral wall 32 of the box body 33.

The half-cut hinges 91 and 92 are structured, in the illustrated case, such that the respective portions of the box body 33 and the lid body 35 and the connection wall 93 are integrally molded by a synthetic resin. The half-cut hinges 91 and 92 are provided in parallel along the border of the bottom wall 31 and the connection wall 93 and along the border of the lid wall 36 and the connection wall 93. However, the structure may be made such that the box body 33, the lid body 35 and the connection wall 93 are independently formed, and are connected by a pin hinge.

Further, in the illustrated embodiments, the connection wall 93 has the same length as an entire length of the side edges of the bottom wall 31 and the lid wall 36 to which the connection wall 93 is connected. However, the invention is not limited to this, and the connection wall 93 can be provided along a single part or plural part of the side.

Further, the display case K is provided with the lock apparatus B which can not be unlocked except at the shop, and in which the locking part 42 can be removed and retained at the shop in accordance with the unlocking operation at the shop.

Since the structure of the lock apparatus B and the locking part 42, and the operations and effects of the locking and unlocking are the same as those of the first embodiment, a further description thereof will be omitted.

Further, the tag C is provided in the locking part 42 in the same manner as that of the third embodiment, thereby detecting if the display case K in the locked state is brought out of the shop.

Since the tag C mentioned above is the same as that of the third embodiment, a further description thereof will be omitted.

The receiving case A' is structured by the box body 51 receiving the disc a, the video tape or the like corresponding to the commodity, and the lid body 54 provided along one side edge of the box body 51 so as to allow the box body 51 to be freely opened and closed via a pin hinge without being limited to the hinge 61 or the half-cut hinge.

In this case, since the hinge 61 and the receiving case A' are the same as those of the fourth embodiment in the illustrated case, a further detailed description will be omitted.

Then, the box body 51 of the receiving case A' is fitted to the box body 33 of the display case K, and the lid body 54 is fitted to the lid body 35.

At this time, the receiving case A' is fitted to the display case K such that the hinge 61 of the receiving case A' is arranged in parallel to the hinges 91 and 92 of the display case K and at a position close thereto.

Further, the box body 51 of the receiving case A' is prevented from sliding in the direction of the connection wall 93 with respect to the box body 33 of the display case K, by a movement preventing means 95.

The movement preventing means 95 mentioned above is structured, in the illustrated case, such that a hole 96 is provided in one of both parallel side surfaces in both the box bodies 33 and 51, and a projection or shaft 97 fitted to the hole 96 is provided in another side, whereby the slide of the receiving case A' is prevented by fitting the projection 97 to the hole 96, on the basis of an engagement relation generated by the fitting. However, the object can be achieved by the other systems.

Accordingly, since the slide of the box body 51 within the box body 33 is prevented by the movement preventing means 95, at a time of opening the lid body 35 of the display case K and opening the lid body 54 of the receiving case A', the box body 51 does not protrude from the open side having the connection wall 93 of the box body 33 due to the movement.

Therefore, at a time of closing the lid body 35 of the display case K, the lid body 35 can be smoothly closed without being disturbed by collision between the box body 51 of the receiving case A' and the lid body 35 or the like.

In this case, a notch portion 75 to which the fitted fingertip is pressed or picked up is provided in a desired position around the display case K, as illustrated.

Accordingly, the same effect as that of the fifth embodiment can be achieved.

Since the notch portion 75 mentioned above is the same as that of the fifth embodiment, a further description thereof will be omitted.

Further, the receiving case A' is inhibited from being pulled out within the display case K, by the connection wall 93.

In this case, the through window 41 may be provided in the bottom wall 31 and the lid wall 36.

What is claimed is:

1. An anti-theft device for use with a rental commodity to be rented from a shop, comprising:

a receiving case for receiving the rental commodity therein;

a display case for holding said receiving case therein to allow for display of said receiving case;

a lock apparatus for locking said display case in a closed condition to prevent removal of said receiving case from said display case, said lock apparatus including a fixed locking portion constituted by fixed parts of said display case, and a locking part removably inserted to said fixed locking portion in such a manner that said locking part is removable from said fixed locking portion by use of a locking part removal tool to be provided at the shop so that said locking part can be removed from said fixed locking portion at the shop;

wherein said receiving case includes a first box body, and a first lid body pivotally connected to said first box body via a first hinge for movement between open and closed conditions;

wherein said display case includes a second box body, and a second lid body pivotally connected to said second box body via a second hinge for movement between open and closed conditions;

wherein said receiving case and said display case are constructed such that said receiving case is removably received in said display case and, when said receiving case is received in said display case, said second lid body is movable between said open and closed conditions thereof independently of movement of said first lid body between said open and closed conditions thereof, such that said first lid body can be moved from said closed condition to said open condition thereof either subsequent to movement of said second lid body from said closed condition to said open condition thereof, or simultaneously therewith;

wherein said display case includes at least one movement-preventing projection that, when said receiving case is received in said display case, inhibits said receiving case from falling out of said display case; and wherein, when said receiving case is received in said display case, said at least one movement-preventing projection bears against said first box body but not against said first lid body, such that said first lid body can be moved between said open and closed conditions while said box body is held by said at least one movement-preventing projection.

2. An anti-theft device according to claim 1, wherein said first hinge defines a first pivot axis about which said first lid body pivots relative to said first box body;

said second hinge defines a second pivot axis about which said second lid body pivots relative to said second box body; and said first pivot axis is mutually parallel with said second pivot axis when said receiving case is received in said display case.

3. An anti-theft device according to claim 2, wherein said first hinge comprises at least one first hinge pin; and said second hinge comprises at least one second hinge pin.

4. An anti-theft device according to claim 1, wherein said first hinge comprises at least one first hinge pin; and said second hinge comprises at least one half-cut hinge.

5. An anti-theft device according to claim 4, wherein said second box body comprises a bottom wall and peripheral walls projecting upwardly from peripheral sides of said bottom wall;

said second lid body comprises a lid wall;

said at least one half-cut hinge comprises two half-cut hinges interconnected by a connection wall;

said bottom wall is connected to and continuous with said connection wall via one of said two half-cut hinges; and said lid wall is connected to and continuous with said connection wall via the other of said two half-cut hinges.

6. An anti-theft device according to claim 1, wherein a locking arrangement is provided at a side of said display case opposite said second hinge thereof for preventing said first box body from falling out of said second box body, said locking arrangement including a protruding piece projecting inwardly from a peripheral wall of said second box body of said display case, and a recess or hole provided in a peripheral wall of said first box body to receive said protruding piece.

7. An anti-theft device according to claim 1, wherein
said second box body comprises a bottom wall and peripheral walls projecting upwardly from peripheral sides of said bottom wall;
said second lid body comprises a lid wall; and
said display case has a notch portion formed therein to allow gripping and opening of said display case or both said display case and said receiving case, said notch portion being formed in one of: at least one of said peripheral walls of said second box body; and a peripheral portion of at least one of said lid wall of said lid body and said bottom wall of said box body, and at least one of said peripheral walls of said second box body.

8. An anti-theft device for use with a rental commodity to be rented from a shop, comprising:
a receiving case for receiving the rental commodity therein;
a display case for holding said receiving case therein to allow for display of said receiving case;
a lock apparatus for locking said display case in a closed condition to prevent removal of said receiving case from said display case said lock apparatus including a fixed locking portion constituted by fixed parts of said display case, and a locking part removably inserted to said fixed locking portion in such a manner that said locking part is removable from said fixed locking portion by use of a locking part removal tool to be provided at the shop so that said locking part can be removed from said fixed locking portion at the shop;
wherein said receiving case includes a first box body, and a first lid body pivotally connected to said first box body via a first hinge for movement between open and closed conditions;
wherein said display case includes a second box body, and a second lid body pivotally connected to said second box body via a second hinge for movement between open and closed conditions;
wherein said receiving case and said display case are constructed such that said receiving case is removably received in said display case and, when said receiving case is received in said display case, said second lid body is movable between said open and closed conditions thereof independently of movement of said first lid body between said open and closed conditions thereof, such that said first lid body can be moved from said closed condition to said open condition thereof either subsequent to movement of said second lid body from said closed condition to said open condition thereof, or simultaneously therewith;
wherein said fixed locking portion of said lock apparatus comprises plural, mutually spaced-apart first tubular bodies fixed to said second box body of said display case at a side thereof opposite said second hinge, and plural, mutually spaced-apart second tubular bodies fixed to said second lid body at a side thereof opposite said second hinge, said first tubular bodies and said second tubular bodies being arranged so that said first tubular bodies are interdigitated with said second tubular bodies with through holes of said first tubular bodies aligned with through holes of said second tubular bodies when said second lid body is in said closed condition relative to said second box body;
wherein said locking part of said lock apparatus comprises an elongated slider that is removably inserted through said through holes of said first and second tubular bodies when said through holes of said first and second tubular bodies are aligned with each other; and
wherein said slider of said lock apparatus is provided with an electronically-detectable anti-theft tag which, if not removed from said display case by removal of said locking part from said first and second tubular portions, can be detected upon removal of said display case from the shop.

9. An anti-theft device according to claim 8 wherein
said lock apparatus further includes a metal hook portion on one of said slider and said fixed locking portion, and a hook-receiving recess in the other of said slider and said fixed locking portion for receiving said metal hook portion, said metal hook portion and said hook-receiving recess being arranged so that said metal hook portion is engageable in said hook-receiving recess and can be retracted therefrom by a magnet of the locking part removal tool in order to allow removal of said slider from said first and second tubular portions.

10. An anti-theft device for use with a rental commodity to be rented from a shop, comprising:
a receiving case for receiving the rental commodity therein;
a display case for holding said receiving case therein to allow for display of said receiving case;
a lock apparatus for locking said display case in a closed condition to prevent removal of said receiving case from said display case, said lock apparatus including a fixed locking portion constituted by fixed parts of said display case, and a locking part removably inserted to said fixed locking portion in such a manner that said locking part is removable from said fixed locking portion by use of a locking part removal tool to be provided at the shop so that said locking part can be removed from said fixed locking portion at the shop;
wherein said receiving case includes a first box body, and a first lid body pivotally connected to said first box body via a first hinge for movement between open and closed conditions;
wherein said display case includes a second box body, and a second lid body pivotally connected to said second box body via a second hinge for movement between open and closed conditions;
wherein said first hinge of said receiving case comprises at least one hinge pin, and hinge pin bearing portions provided on said first box body and said first lid body for supporting said at least one hinge pin;
wherein said first lid body of said receiving case includes peripheral side walls on opposing sides of said first lid body, and at least one of said peripheral side walls has a side wall end portion that is shaped so that, when said first lid body is moved to an upright condition relative to said first box body, said side wall end portion bears against said second box body of said display case so as to hold said first lid body in said upright condition;
wherein said fixed locking portion of said lock apparatus comprises plural mutually spaced-apart first tubular bodies fixed to said second box body of said display case at a side thereof opposite said second hinge, and plural, mutually spaced-apart second tubular bodies fixed to said second lid body at a side thereof opposite said second hinge first tubular bodies and said second tubular bodies being arranged so that said first tubular bodies are interdigitated with said second tubular bodies with through holes of said first tubular bodies aligned with through holes of said second tubular bodies when said second lid body is in said closed condition relative to said second box body;
wherein said locking part of said lock apparatus comprises an elongated slider that is removably inserted through said through holes of said first and second tubular bodies when said through holes of said first and second tubular bodies are aligned with each other; and
wherein said slider of said lock apparatus is provided with an electronically-detectable anti-theft tag which, if not removed from said display case by removal of said locking part from said first and second tubular portions, can be detected upon removal of said display case from the shop.

11. An anti-theft device according to claim 10, wherein said first hinge defines a first pivot axis about which said first lid body pivots relative to said first box body;

said second hinge defines a second pivot axis about which said second lid body pivots relative to said second box body; and said first pivot axis is mutually parallel with said second pivot axis when said receiving case is received in said display case.

12. An anti-theft device according to claim 11, wherein said first hinge comprises at least one first hinge pin; and said second hinge comprises at least one second hinge pin.

13. An anti-theft device according to claim 10, wherein said first hinge comprises at least one first hinge pin; and said second hinge comprises at least one half-cut hinge.

14. An anti-theft device according to claim 13, wherein said second box body comprises a bottom wall and peripheral walls projecting upwardly from peripheral sides of said bottom wall;

said second lid body comprises a lid wall;

said at least one half-cut hinge comprises two half-cut hinges interconnected by a connection wall;

said bottom wall is connected to and continuous with said connection wall via one of said two half-cut hinges; and said lid wall is connected to and continuous with said connection wall via the other of said two half-cut hinges.

15. An anti-theft device according to claim 10, wherein said lock apparatus further includes a metal hook portion on one of said slider and said fixed locking portion, and a hook-receiving recess in the other of said slider and said fixed locking portion for receiving said metal hook portion, said metal hook portion and said hook-receiving recess being arranged so that said metal hook portion is engageable in said hook-receiving recess and can be retracted therefrom by a magnet of the locking part removal tool in order to allow removal of said slider from said first and second tubular portions.

16. An anti-theft device for use with a rental commodity to be rented from a shop, comprising:

a receiving case for receiving the rental commodity therein;

a display case for holding said receiving case therein to allow for display of said receiving case;

a lock apparatus for locking said display case in a closed condition to prevent removal of said receiving case from said display case, said lock apparatus including a fixed locking portion constituted by fixed parts of said display case, and a locking part removably inserted to said fixed locking portion in such a manner that said locking part is removable from said fixed locking portion by use of a locking part removal tool to be provided at the shop so that said locking part can be removed from said fixed locking portion at the shop;

wherein said receiving case includes a first box body, and a first lid body pivotally connected to said first box body via a first hinge for movement between open and closed conditions;

wherein said display case includes a second box body, and a second lid body pivotally connected to said second box body via a second hinge for movement between open and closed conditions;

wherein said display case includes at least one movement-preventing projection that, when said receiving case is received in said display case, inhibits said receiving case from falling out of said display case;

wherein, when said receiving case is received in said display case, said at least one movement-preventing projection bears against said first box body but not against said first lid body, such that said first lid body can be moved between said open and closed conditions while said first box body is held by said at least one movement-preventing projection;

wherein said second box body comprises a bottom wall and peripheral walls projecting upwardly from peripheral sides of said bottom wall;

wherein said peripheral walls include a rear peripheral wall provided at a peripheral side of said second box body at which said second lid body is pivotally connected to said second box body via said second hinge; and wherein said at least one movement-preventing projection comprises a pair of spaced-apart movement-preventing tabs projecting forward from a top of said rear peripheral wall so as to engage atop said first box body of said receiving case at a rear portion of said first box body at which said first lid body is pivotally connected to said first box body via said first hinge.

* * * * *